United States Patent
Neo et al.

(10) Patent No.: US 9,824,713 B2
(45) Date of Patent: Nov. 21, 2017

(54) LIGHT INFORMATION DEVICE AND LIGHT INFORMATION PROCESSING METHOD

(71) Applicant: Hitachi Consumer Electronics Co., Ltd., Yokohama-shi, Kanagawa (JP)

(72) Inventors: Atsushi Neo, Tokyo (JP); Jyunya Iizuka, Tokyo (JP)

(73) Assignee: Hitachi Consumer Electronics Co., Ltd., Yokohama-shi (JP)

(*) Notice: Subject to any disclaimer, the term of this patent is extended or adjusted under 35 U.S.C. 154(b) by 0 days.

(21) Appl. No.: 15/305,002

(22) PCT Filed: Apr. 21, 2014

(86) PCT No.: PCT/JP2014/061115
§ 371 (c)(1),
(2) Date: Oct. 18, 2016

(87) PCT Pub. No.: WO2015/162653
PCT Pub. Date: Oct. 29, 2015

(65) Prior Publication Data
US 2017/0186461 A1 Jun. 29, 2017

(51) Int. Cl.
*G11B 7/00* (2006.01)
*G11B 7/0065* (2006.01)

(52) U.S. Cl.
CPC .... *G11B 7/0065* (2013.01); *G11B 2220/2504* (2013.01)

(58) Field of Classification Search
CPC .... G11B 7/0065; G11B 7/083; G11B 7/00781
(Continued)

(56) References Cited

U.S. PATENT DOCUMENTS 5,172,262 A * 12/1992 Hornbeck .......... G02B 6/12004
348/770
2002/0110067 A1 8/2002 Kondo et al.
(Continued)

FOREIGN PATENT DOCUMENTS

JP  2002-260286 A  9/2002
JP  2007-41329 A   2/2007
(Continued)

OTHER PUBLICATIONS

International Search Report (PCT/ISA/210) issued in PCT Application No. PCT/JP2014/061115 dated Dec. 22, 2014 with English translation (5 pages).

*Primary Examiner* — Nabil Hindi
(74) *Attorney, Agent, or Firm* — Crowell & Moring LLP

(57) ABSTRACT

Provided is a light information device, and the like, that records header information on an information recording medium, after preventing screen burn of a spatial light modulator. One example of the solution in the present invention is a light information device that records two-dimensional page data on an information recording medium and is provided with a first information generation unit, a second information generation unit that generates a second bit string on the basis of a first bit string, and a spatial light modulation unit that displays a pattern corresponding to the second bit string. The second information generation unit: performs a first processing, on the first bit string corresponding to first identification information, that inverts each bit at a prescribed cycle; generates the second bit string corresponding to the first identification information; performs a second processing, different from the first processing, on the first bit string corresponding to second identification information that includes bits which are switched at the same cycle as the prescribed cycle; and generates the second bit (Continued)

string corresponding to the second identification information.

21 Claims, 21 Drawing Sheets

(58) Field of Classification Search
USPC .......................................................... 369/103
See application file for complete search history.

(56) References Cited

U.S. PATENT DOCUMENTS

2005/0270855 A1   12/2005   Earhart et al.
2010/0232278 A1    9/2010   Ogasawara

FOREIGN PATENT DOCUMENTS

| JP | 2007-305230 A | 11/2007 |
| JP | 2008-171480 A | 7/2008 |
| JP | 2009-230831 A | 10/2009 |
| WO | WO 2007/111139 A1 | 10/2007 |

\* cited by examiner

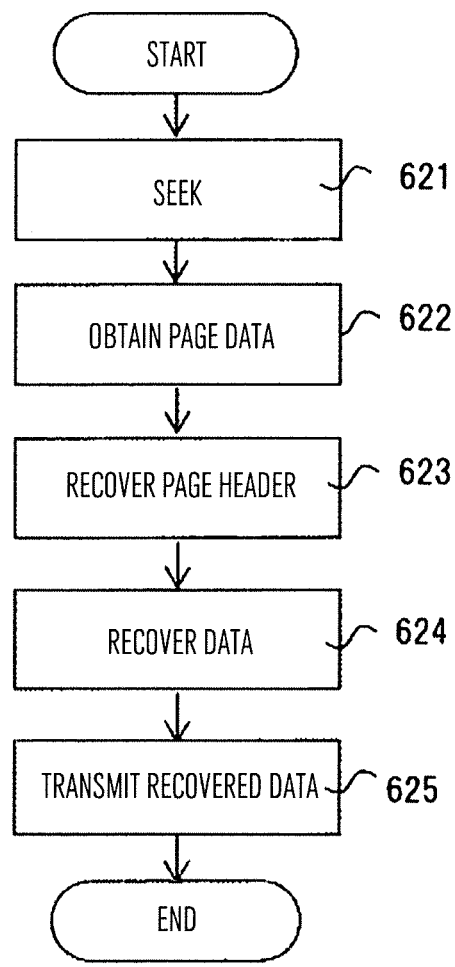

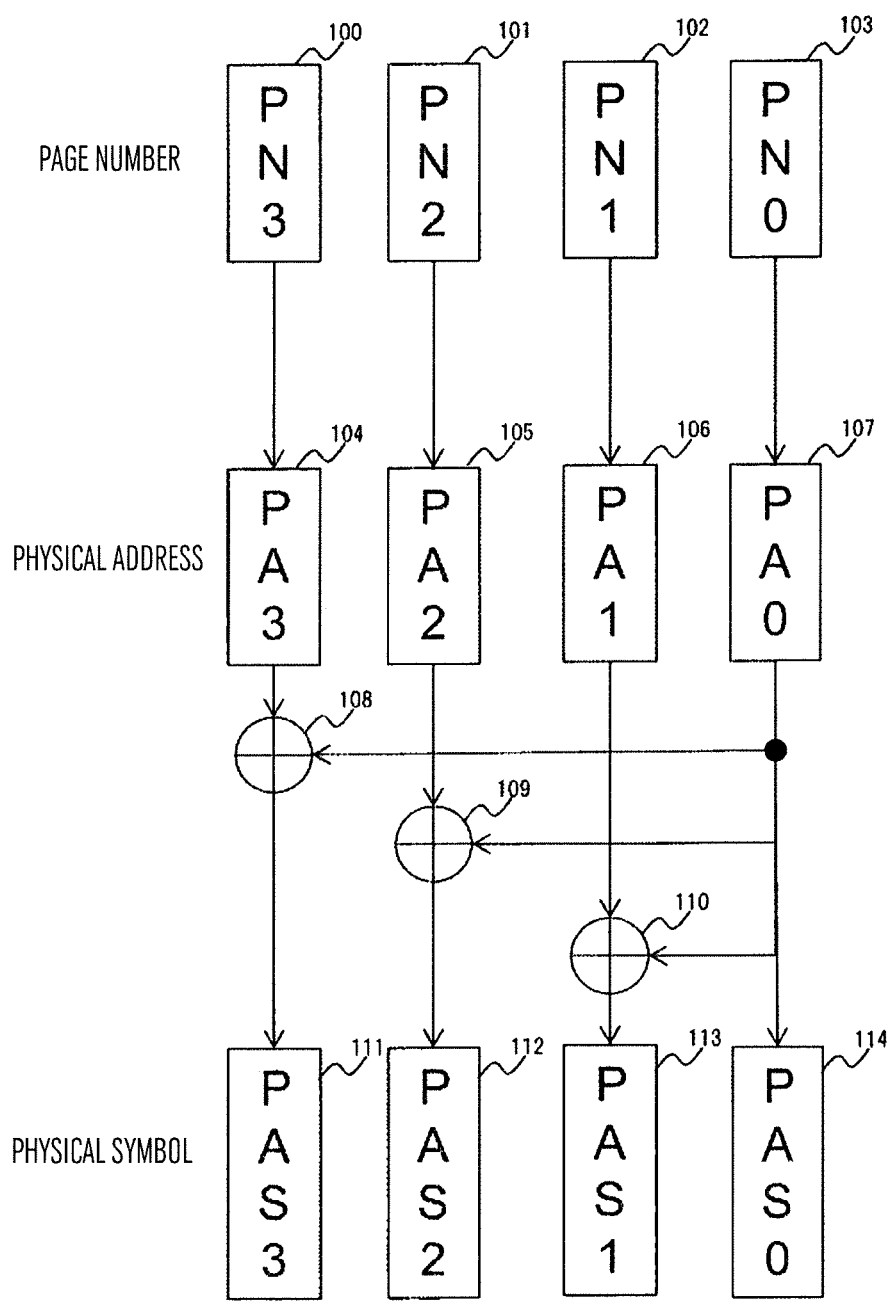

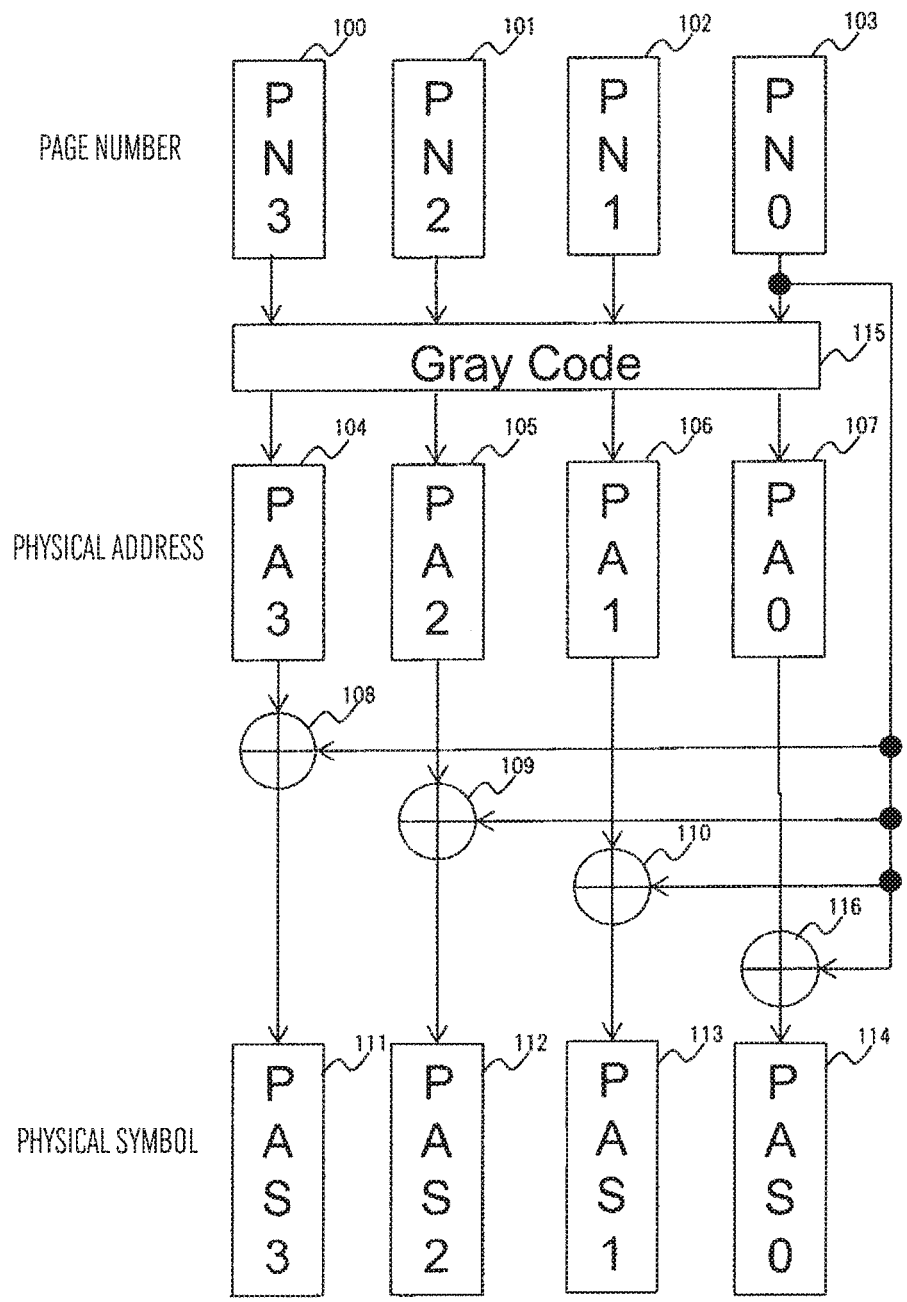

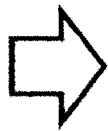
FIG. 14A → FIG. 14B

LIGHT INFORMATION DEVICE AND LIGHT INFORMATION PROCESSING METHOD

TECHNICAL FIELD

The present invention relates to a light information device and light information processing.

BACKGROUND ART

There is US2005-0270855 (Patent Literature 1) as a background art of this technical field. This publication indicates that a page header includes a page number which is page information in a chapter (snip) the header is recorded in a format in a form of a barcode (snip) a bit flipping is performed in an odd-numbered page in order to avoid a fixed pattern on a spatial light modulator.

WO2007-111139 (Patent Literature 2) indicates that "the recording method is a recording method for optically performing recording of two-dimensional data including a positioning mark and a data area onto a recording medium, wherein a state of a positioning mark is changed from a first state to at least one second state that is different from the first state for each predetermined number of times of recording of the two-dimensional data".

CITATION LIST

Patent Literature

PATENT LITERATURE 1: US2005-0270855
PATENT LITERATURE 2: WO2007-111139

SUMMARY OF INVENTION

Technical Problem

In a hologram recording device using holography, a signal beam obtained by causing a coherent light beam to be reflected by a spatial light modulator or to transmit through the spatial light modulator and modulating the light in accordance with two-dimensional data in a spatial manner and a reference beam of the coherent light beam are caused to be incident upon a light information medium in such a manner that the signal beam and the reference beam overlaps each other, so that an interference pattern is formed in the recording medium, and this pattern is written to the recording medium, and accordingly information is recorded. Recording based on angle multiplexing can be done by changing the incidence angle of the reference beam incident upon the light information recording medium. As described above, in a hologram recorded by changing the reference beam angle in the same angle, a hologram corresponding to each reference beam angle will be referred to as a page, and a set of pages multiplexed by angle in the same area will be referred to as a book.

When information is reproduced from the light information medium, it is necessary to confirm that the detected page data is a page including a target data defined in advance before the user data is decoded from the page data. Information used for confirmation of the page data is preferably recorded as page header information in an area different form user data in a simple format that can be determined accurately so that the information is reproduced accurately in a short processing time.

Therefore, Patent Literature 1 indicates that a page header including a book address and a page number is converted into binary numbers for each page, and thereafter, the binary numbers are converted into bar codes respectively corresponding to "1" and "0", and recorded to the light information medium.

Meanwhile, when the spatial light modulator continues to display a fixed pattern for a predetermined period of time or more, a burn-in phenomenon occurs to lose an image display function. Information included in a page header such as a book address continues to hold the same information in the same book, and therefore, the burn-in phenomenon of the spatial light modulator may occur. Accordingly, Patent Literature 1 indicates that bit flipping is performed on an odd-numbered page or an even-numbered page in order to suppress the burn-in phenomenon of the spatial light modulator.

However, in a case where, for example, a page number is recorded to a light information medium by using methods described in Patent Literatures 1 and 2, the recording pattern of the least significant bit of the page number recorded to the light information medium is a fixed pattern, which causes a burn-in phenomenon at the spatial light modulator. This burn-in phenomenon will be explained in details with reference to FIGS. 14(a) AND 14(b). FIG. 14(a) illustrates the values of decimal numbers (1400) and binary numbers (1401) of page numbers recorded in the page header, and FIG. 14(b) illustrates values (1403) obtained by bit-flipping the page numbers described as binary numbers in the odd-numbered page in order to suppress burn-in of a spatial light modulator 312. In a case where the page header is recorded by applying a conventional technique, the least significant bits 1406 of the page numbers are fixed values as indicated in the binary numbers 1403 of FIG. 14(b), and a burn-in occurs in an area where the least significant bit 1406 of the page number of the spatial light modulator 312 is displayed.

Accordingly, it is an object of the present invention to provide a light information device and a light information processing method for recording header information and the like to an information recording medium while suppressing burn-in of a spatial light modulator.

Solution to Problem

In order to solve the above problem, as an example of the present invention, a pattern generated on a spatial optical modulation unit is generated by performing different processing for information such as a page number and information such as a book address and a header pattern.

Advantageous Effects of Invention

According to the present invention, a light information device and a light information processing method for recording header information and the like to an information recording medium while suppressing burn-in of a spatial light modulator can be provided.

BRIEF DESCRIPTION OF DRAWINGS

FIG. 6C is a schematic diagram illustrating an operation flow of the light information recording and recovering device.

FIG. 10A is an example of a conversion method of a page number.

FIG. 12 is an example of a conversion method of a page number.

FIGS. 14A and 14B illustrate a conversion method of a page number according to a conventional technique.

DESCRIPTION OF EMBODIMENTS

Hereinafter, embodiments will be explained with reference to drawings.

First Embodiment

Figure 2:
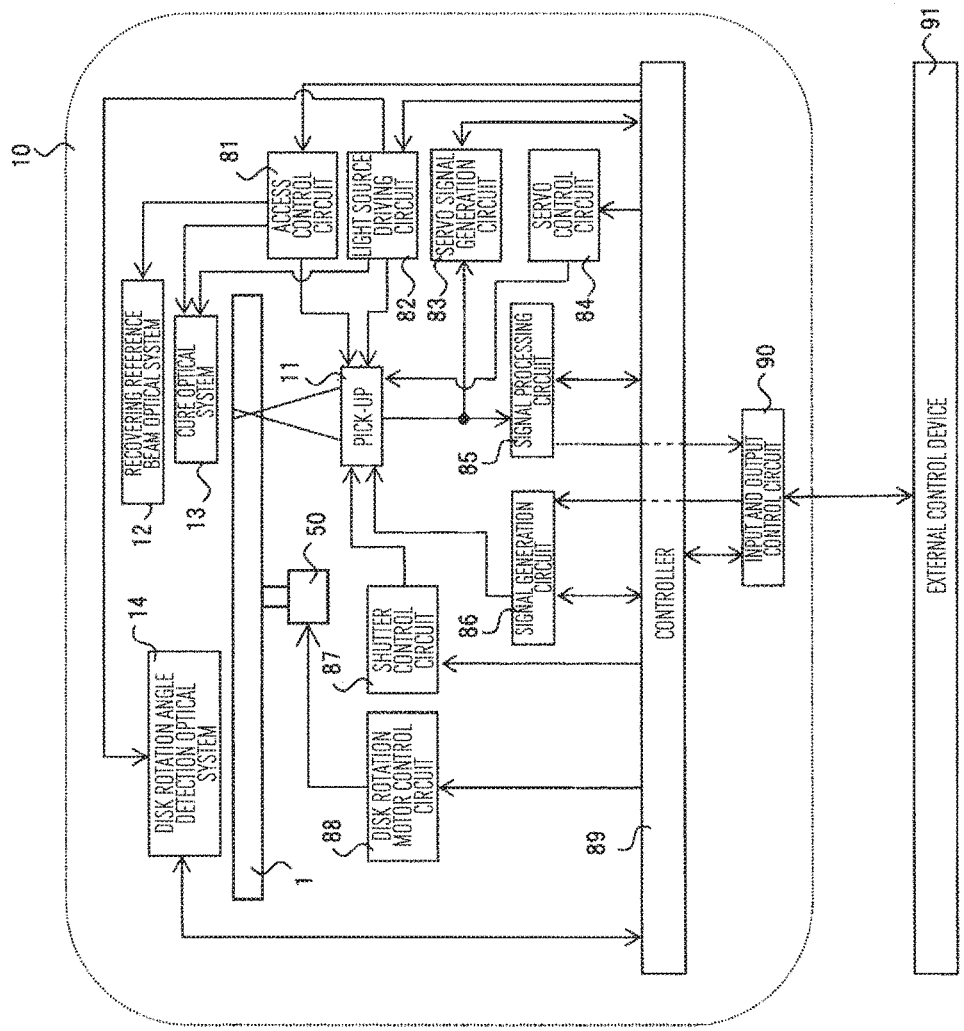
FIG. 2 is a block diagram illustrating a light information recording and recovering device.

An embodiment of the present invention will be explained with reference to appended drawings. FIG. 2 is a block diagram illustrating a recording and recovering device of a light information recording medium for recording and/or recovering digital information by using holography.

A light information recording and recovering device 10 is connected to an external control device 91 via an input and output control circuit 90. In a case of recording, the light information recording and recovering device 10 uses the input and output control circuit 90 to receive an information signal, which is to be recorded, from the external control device 91. In a case of recovering, the light information recording and recovering device 10 uses the input and output control circuit 90 to transmit the recovered information signal to the external control device 91.

The light information recording and recovering device 10 includes a pick-up 11, a recovering reference beam optical system 12, a cure optical system 13, a disk rotation angle detection optical system 14, and a rotation motor 50. The light information recording medium 1 is configured to be rotatable by the rotation motor 50.

The pick-up 11 emits a reference beam and a signal beam to the light information recording medium 1, and plays a role of recording digital information to the recording medium by using holography. At this occasion, the information signal to be recorded is sent by a controller 89 via a signal generation circuit 86 to a spatial light modulator in the pick-up 11, and the signal beam is modulated by the spatial light modulator.

In a case where information recorded in the light information recording medium 1 is to be recovered, the recovering reference beam optical system 12 generates a light wave so that a reference beam emitted from the pick-up 11 is incident upon the light information recording medium in a direction opposite to that of the recording. The recovered beam recovered with the recovering reference beam is detected by a light detector explained later in the pick-up 11, and the signal is recovered by a signal processing circuit 85.

Emission times of the reference beam and the signal beam emitted onto the light information recording medium 1 can be controlled by causing the controller 89 to control open and close times of the shutter in the pick-up 11 via a shutter control circuit 87.

The cure optical system 13 plays a role of generating a light beam used for pre-cure and post-cure of the light information recording medium 1. The pre-cure is pre-processing for emitting a predetermined light beam before the reference beam and the signal beam are emitted to a desired position when information is recorded to a desired position in the light information recording medium 1. The post-cure is post-processing for emitting a predetermined light beam to a desired position for finalization after information is recorded to the desired position in the light information recording medium 1.

The disk rotation angle detection optical system 14 is used to detect the rotation angle of the light information recording medium 1. In a case where the light information recording medium 1 is adjusted to a predetermined rotation angle, the disk rotation angle detection optical system 14 detects a signal according to the rotation angle, and the controller 89 can control the rotation angle of the light information recording medium 1 via a disk rotation motor control circuit 88 by using the detected signal.

A predetermined light source driving electric current is provided from a light source driving circuit 82 is provided to the light sources in the pick-up 11, the cure optical system 13, and the disk rotation angle detection optical system 14, and each light source can emit a light beam with a predetermined light quantity.

The pick-up 11 as well as the disk cure optical system 13 is provided with a mechanism for sliding the position in a radius direction of the light information recording medium 1, and performs position control via an access control circuit 81.

By the way, in the recording technique using the principle of angle multiplexing of holography, the tolerance with respect to the deviation of the reference beam angle tends to be extremely small.

Therefore, a mechanism for detecting the amount of deviation of the reference beam angle is required to be provided in the pick-up 11, and a servo signal generation circuit 83 generates a signal for servo control, and a servo mechanism for correcting the amount of deviation via a servo control circuit 84 is required to be provided in the light information recording and recovering device 10.

The pick-up 11, the cure optical system 13, and the disk rotation angle detection optical system 14 may be simplified in such a manner that several optical system configurations or all the optical system configurations are combined into a single configuration.

Figure 3:
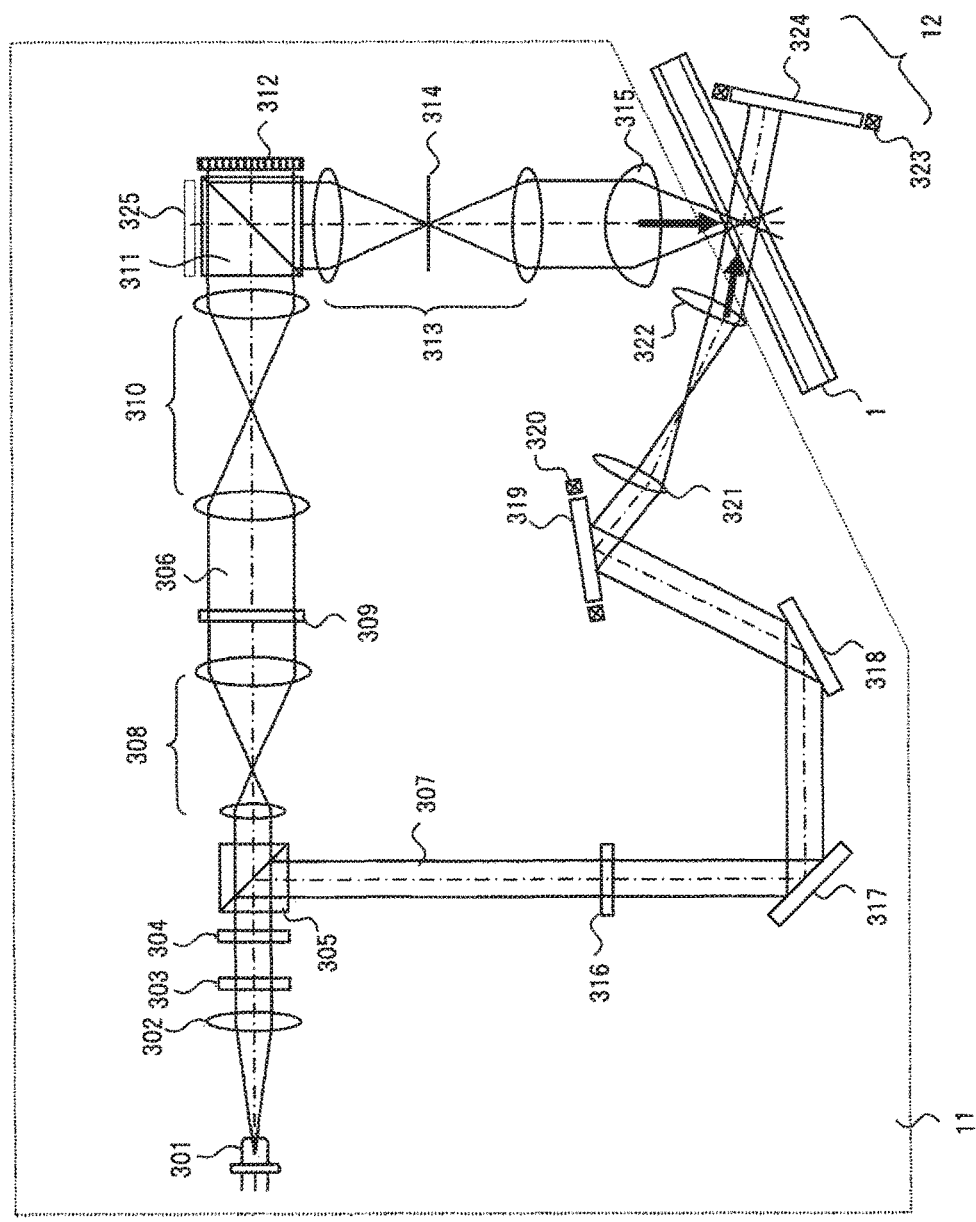
FIG. 3 is a schematic diagram illustrating a pick-up in the light information recording and recovering device.

FIG. 3 illustrates a recording principle according to an example of a basic optical system configuration of the pick-up 11 in the light information recording and recovering device 10. The light beam that is output from a light source 301 passes through a collimator lens 302 to be incident upon a shutter 303. When the shutter 303 is open, the light beam passes through the shutter 303, and thereafter, for example, an optical element 304 constituted by a half wavelength plate and the like controls the polarization direction so that a light quantity ratio of p polarization and s polarization attains a desired ratio, and thereafter, the light beam is incident upon a PBS (Polarization Beam Splitter) prism 305.

The light beam having passed through the PBS prism 305 works as a signal beam 306, and the light beam diameter is expanded by the beam expander 308, and thereafter, the light beam passes through a phase mask 309, a relay lens 310, and a PBS prism 311 to be incident upon the spatial light modulator 312.

A signal beam having information added by the spatial light modulator 312 is reflected by the PBS prism 311, and the signal beam propagates through a relay lens 313 and a spatial filter 314. Thereafter, the signal beam is condensed by the objective lens 315 onto the light information recording medium 1.

Meanwhile, the light beam reflected by the PBS prism 305 works as a reference beam 307, and the polarization direction conversion device 316 sets the light beam into a predetermined polarization direction in accordance with recording process or recovering process, and thereafter, the light beam is incident upon a galvanometer mirror 319 via the mirror 317 and the mirror 318. The angle of the galvanometer mirror 319 can be adjusted by an actuator 320, and therefore, the incidence angle of the reference beam passing through the lens 321 and the lens 322 and then incident upon the light information recording medium 1 can be set to a desired angle. It should be noted that a device for converting the wave front of the reference beam may be used instead of the galvanometer mirror in order to set the incidence angle of the reference beam.

As described above, the signal beam and the reference beam are caused to be incident upon the light information recording medium 1 in such a manner that the signal beam and the reference beam overlap each other, so that an interference pattern is formed in the recording medium, and this pattern is written to the recording medium, whereby information is recorded. Since the incidence angle of the reference beam incident upon the light information recording medium 1 can be changed by the galvanometer mirror 319, recording based on angle multiplexing can be performed.

Hereinafter in a hologram recorded by changing the reference beam angle in the same angle, a hologram corresponding to each reference beam angle will be referred to as a page, and a set of pages multiplexed by angle in the same area will be referred to as a book.

Figure 4:
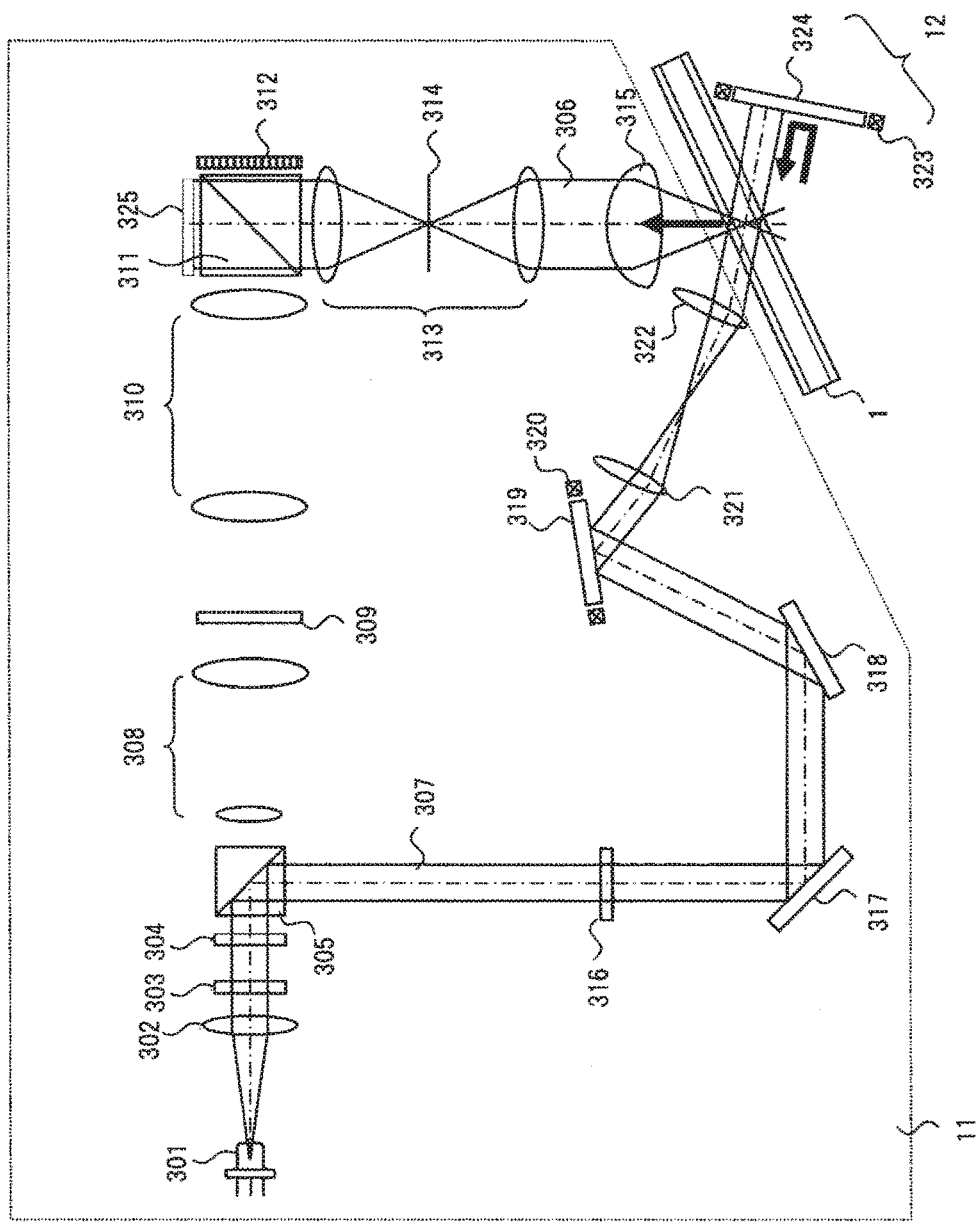
FIG. 4 is a schematic diagram illustrating a pick-up in the light information recording and recovering device.

FIG. 4 illustrates a recovering principle in an example of a basic optical system configuration of the pick-up 11 in the light information recording and recovering device 10. In a case where the recorded information is to be recovered, the reference light beam is caused to be incident upon the light information recording medium 1 as described above, and the light beam having passed through the light information recording medium 1 is reflected by the galvanometer mirror 324 of which angle can be adjusted by the actuator 323, so that the recovering reference beam is generated.

The recovered beam recovered with this recovering reference beam propagates through the objective lens 315, the relay lens 313, and the spatial filter 314. Thereafter, the recovered beam passes through the PBS prism 311 and is incident upon the light detector 325, so that recorded signal can be recovered. For example, imaging devices such as a CMOS image sensor and a CCD image sensor can be used as the light detector 325, but as long as the page data can be recovered, any device may be used.

Figure 6A:
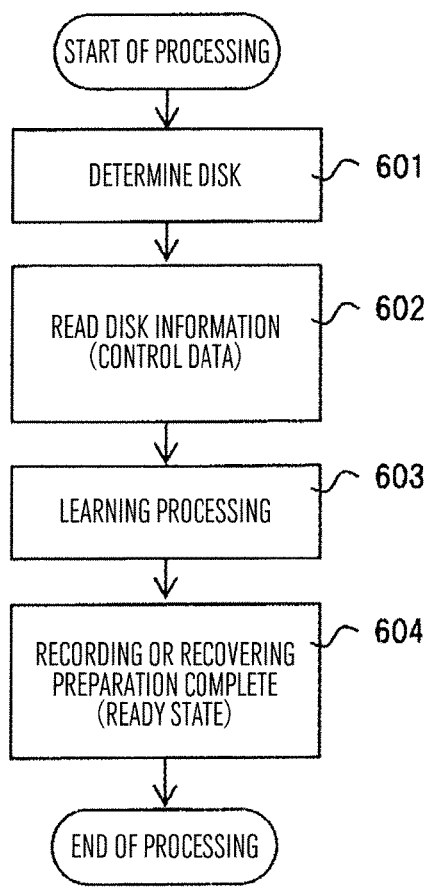
FIG. 6A is a schematic diagram illustrating an operation flow of the light information recording and recovering device.
Figure 6B:
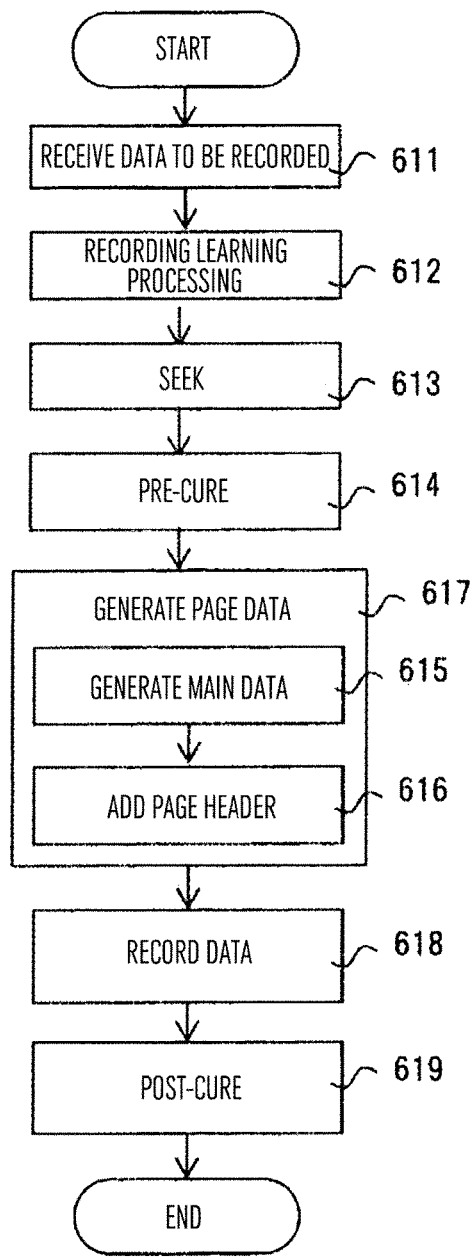
FIG. 6B is a schematic diagram illustrating an operation flow of the light information recording and recovering device.

FIGS. 6(a) and 6(b) illustrate an operation flow of recording and recovering with the light information recording and recovering device 10. In this case, a flow of recording and recovering using holography in particular will be explained.

FIG. 6(a) illustrates an operation flow for completing preparation for recording or recovering after the light information recording medium 1 is inserted into the light information recording and recovering device 10. FIG. 6(b) is an operation flow from a preparation completion state to when information is recorded to the light information recording medium 1. FIG. 6(c) illustrates an operation flow from a preparation completion state to when information recorded in the light information recording medium 1 is recovered.

As illustrated in FIG. 6(a), when a medium is inserted (601), for example, the light information recording and recovering device 10 performs disk determination to determine whether the inserted medium is a medium with which digital information is recorded or recovered by using holography (602).

As a result of disk determination, when the inserted medium is determined to be a light information recording medium with which digital information is recorded or recovered by using holography, the light information recording and recovering device 10 reads control data arranged in the light information recording medium (603) to obtain, for example, information about the light information recording medium and, for example, information about various kinds of setting conditions during recording and recovering.

After the control data is read out, various kinds of adjustment according to the control data and learning processing bout the pick-up 11 are performed (604), and the light information recording and recovering device 10 completes preparation of recording or recovering.

As illustrated in FIG. 6(b), the operation flow from the preparation completion state to when information is recorded is as follows. First, data to be recorded is received (611), and information according to the data is sent to the spatial light modulator 312 in the pick-up 11.

Thereafter, for example, various kinds of learning processing for recording such as power optimization of the light source 301 and optimization of exposure time of the shutter 303 are performed in advance as necessary, so that high quality information can be recorded to the light information recording medium (612).

Thereafter, in a seek operation (613), the access control circuit 81 is controlled to set the position of the pick-up 11 and the cure optical system 13 into a predetermined position of the light information recording medium. In a case where the light information recording medium 1 has address information, the address information is recovered, and a determination is made as to whether the positioning is set an object position, and when the positioning is set at the object position, the amount of deviation from a predetermined position is calculated, and an operation for repositioning is repeatedly performed.

Thereafter, a predetermined area is pre-cured by using the light beam emitted from the cure optical system 13 (614), and page data generation processing (617) including main data generation (615) and page header addition (616) is performed, and data is recorded by using the reference beam and the signal beam emitted from the pick-up 11 (618). After the data is recorded, post-cure is performed by using the light beam emitted from the cure optical system 13 (619). As necessary, data may be verified. The main data is a portion occupying the majority of the page data, and the main data mainly stores user data. The data may include not only the user data but also a table expressing an association between a logical address used by the external control device 91 and the position of each piece of page data in the light information recording medium 1 for particular page data and an alternation position list expressing an association between the positions of page data at an alternation source and an alternation destination in alternation processing of page data which is difficult to be recovered due to failure. The page header and the main data are provided separately so that the page header is an area provided on the page data in order to store information such as a data format such as a type of data recorded in page data and an address for identifying a page multiplexed and recorded, and the main data is an area for recording on the page data. The detailed operation of the main data generation (615) and the page header addition (616) will be explained later.

After the data is recorded, post-cure is performed by using the light beam emitted from the cure optical system 13 (616). As necessary, the data may be verified.

As illustrated in FIG. 6(*c*), the operation flow from the preparation completion state to when recorded information is recovered is as follows. First, the access control circuit 81 is controlled with a seek operation (621), and the positions of the pick-up 11 and the recovering reference beam optical system 12 are set to predetermined positions of the light information recording medium. In a case where the light information recording medium 1 has address information, the address information is recovered, and a determination is made as to whether the positioning is set an object position, and when the positioning is set at the object position, the amount of deviation from a predetermined position is calculated, and an operation for repositioning is repeatedly performed.

Subsequently, the reference beam is emitted from the pick-up 11, and information recorded in the light information recording medium is read out, and the page data is obtained (622), and after the recovering of the page header unit in the page data (623), the recovering data is detected (624) and transmitted (625). In a case where the page data is not determined to be the target page data as a result of recovering (623) of the page header unit, a page data different from the target may be detected, and therefore, the transmission of the recovering data (625) is not transmitted but cancelled, or the processing in (621), (622) are executed again. The detailed operation of the acquisition of the page header (622) and the page header recovering (623) will be explained later.

FIGS. 9(*a*) and 9(*b*) illustrate data processing flow during recording and recovering. FIG. 9(*a*) illustrates a recording data processing flow in a signal generation circuit 86 up to conversion into two-dimensional data on the spatial light modulator 312 after recording data reception processing 611 on the input and output control circuit 90. FIG. 9(*b*) illustrates a recovering data processing flow on the signal processing circuit 85 up to recovering data transmission processing 623 on the input and output control circuit 90 after the light detector 325 detects two-dimensional data.

Data processing during recording will be explained with reference to FIG. 9(*a*). The processing from 901 to 906 corresponds to internal processing of main data generation (615) in the processing of FIG. 6(*b*). When the signal generation circuit 86 receives user data (901), the user data is divided into multiple data strings, and each data string is made into CRC so that error detection can be performed during recovering (902), and scrambling for adding a pseudorandom data string to the data string for the purpose of making the number of ON pixels and the number of OFF pixels be the same number and preventing repetition of the same pattern (903) is performed, and thereafter, error correction coding such as Reed-Solomon Coding (904) is performed so that error correction can be performed during recovering. Subsequently, the modulated data string is converted into two-dimensional data, and this is repeated for a single piece of page data, so that two-dimensional data for a single page is made (905). Image position detection during recovering and a marker serving as a reference in image distortion correction are added to the two-dimensional data configured as described above (906), and a page header is added (616) and the data is transferred to the spatial light modulator 312 (907). The detailed operation of the marker addition (906) and the page header addition (616) will be explained later.

Subsequently, a data processing flow during recovery will be explained with reference to FIG. 9(*b*). Processing in 912 to 919 corresponds to processing in the inside of data recovering (624) in the processing of FIG. 6(*c*). The image data detected by the light detector 325 is transferred to the signal processing circuit 85, and the page data is obtained (622), and the page header is recovered from the detected image data (623), and data stored in the page header is obtained. Subsequently, the image position is detected on the basis of a reference of a marker included in this image data (912), and distortion such as an inclination, a magnification, a distortion, and the like of the image are corrected (913), and thereafter, binarization processing (914) is performed, and the marker is removed (915), so that two-dimensional data for a single page is obtained (916). The two-dimensional data thus obtained is converted into multiple data strings, and thereafter, error correction processing (917) is performed to remove a parity data string. Subsequently, scramble cancelling processing (918) is performed, and error detection processing based on CRC (919) is performed to delete a CRC parity, and thereafter the user data is transmitted via the input and output control circuit 90 (920). In a case where the image position detection based on the marker (912) is expected to be performed easily than the recovering of the page header (623), the order of these processing is switched, and the page header may be searched by using an image position detection result based on the marker. The detailed operation of the page header recovering will be explained later.

Figure 7:
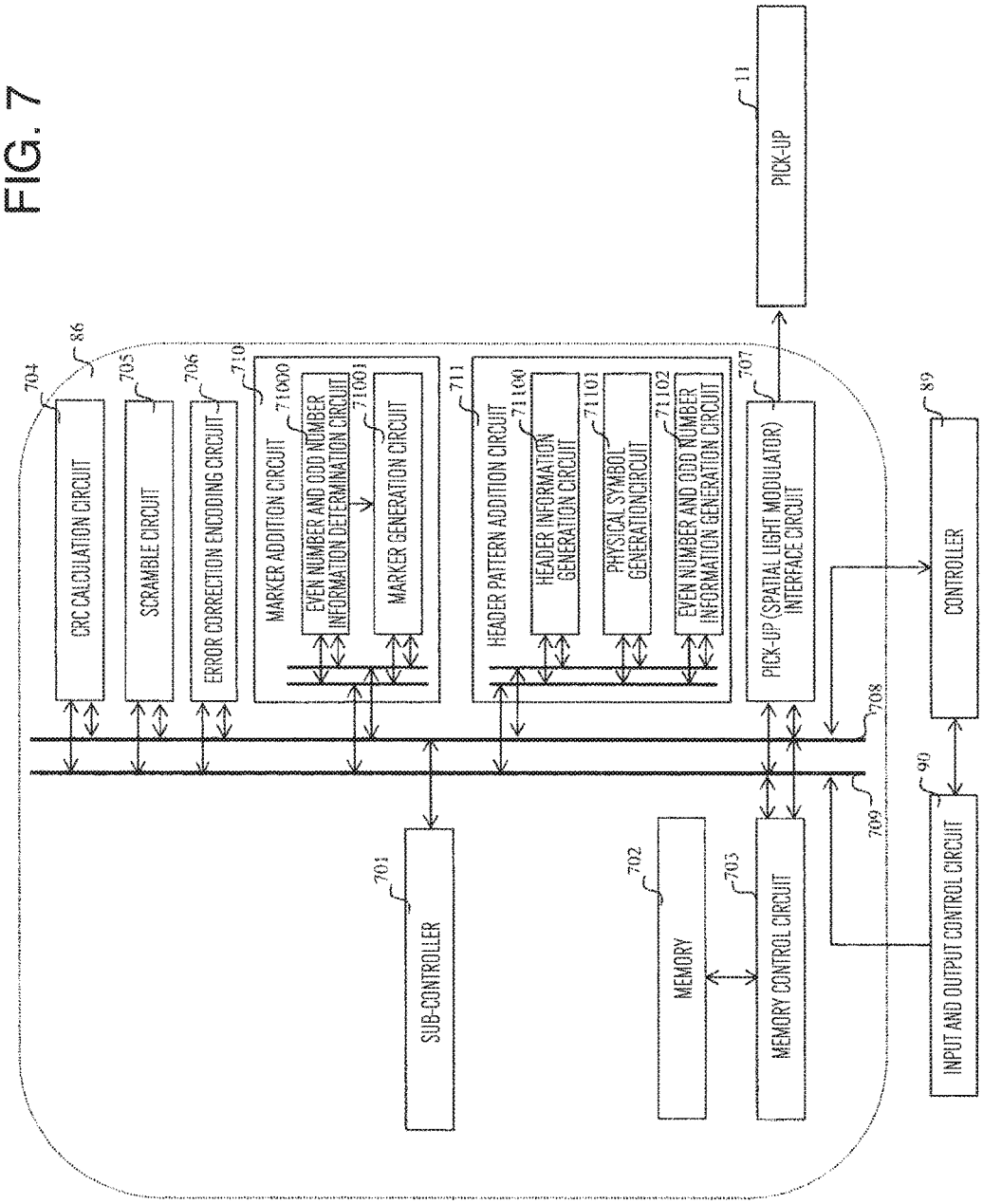
FIG. 7 is a schematic diagram illustrating a signal generation circuit in the light information recording and recovering device.

FIG. 7 is a block diagram illustrating the signal generation circuit 86 of the light information recording and recovering device 10.

When user data is started to be input into the input and output control circuit 90, the input and output control circuit 90 notifies the controller 89 that the input of the user data has started. The controller 89 receives this notification, and commands the signal generation circuit 86 to perform recording processing for data of a single page that is input from the input and output control circuit 90, and gives information, which is to be stored in the page header, to a header pattern addition circuit 711 including a header information generation circuit 71100, a physical symbol generation circuit 71101, and an even number and odd number information generation circuit 71102, and a marker addition circuit 710 including an even number and odd number information determination circuit 71000 and a marker generation circuit 71001. A processing command from the controller 89 is notified via a control line 708 to a sub-controller 701 in the signal generation circuit 86. Upon receiving this notification, the sub-controller 701 controls each signal processing circuit via the control line 708 so as to operate each signal processing circuit in parallel. First, the user data that is input from the input and output control circuit 90 via a data line 709 into a memory control circuit 703 is controlled to be stored in a memory 702.

When a certain amount of user data is stored in the memory 702, a CRC calculation circuit 704 performs control to make user data into CRC. The data made into CRC is scrambled by adding a pseudorandom data string thereby by a scramble circuit 705, and an error correction encoding circuit 706 performs control to perform error correction encoding for adding a parity data string. Then, the marker addition circuit 710 including the even number and odd number information determination circuit 71000 and the marker generation circuit 71001 generates a page number from information stored in the page header, and the even number and odd number information determination circuit 71000 determines an even number and odd number property of a page number from the generated page number, and a recording pattern in a portion of main data of the page data is generated by adding a marker serving as a reference during recovering in accordance with the determination result, and it is stored to the memory 702.

Meanwhile, in the header pattern addition circuit 711, on the basis of information stored in the page header that is input from the controller 89, the physical symbol generation circuit 71101 generates a physical symbol explained later, and the even number and odd number information generation circuit 71102 generates even number and odd number information, and the header information generation circuit 71100 generates information such as the type, the format, the book address, and the like of the data recorded in the page data, and a recording pattern of the page header is generated on the basis of each piece of information generated and stored in the memory 702. The marker generated by the marker generation circuit 71001 at this occasion may be added to the recording pattern of the page header.

Finally, the recording pattern of the main data and the recording pattern of the page header are read from the memory 702 to a pick-up interface circuit 707 in an arrangement order of two-dimensional data on the spatial light modulator 312, and transferred to the spatial light modulator 312 in the pick-up 11. The detailed operation of the header addition circuit 711 will be explained later.

Figure 8:
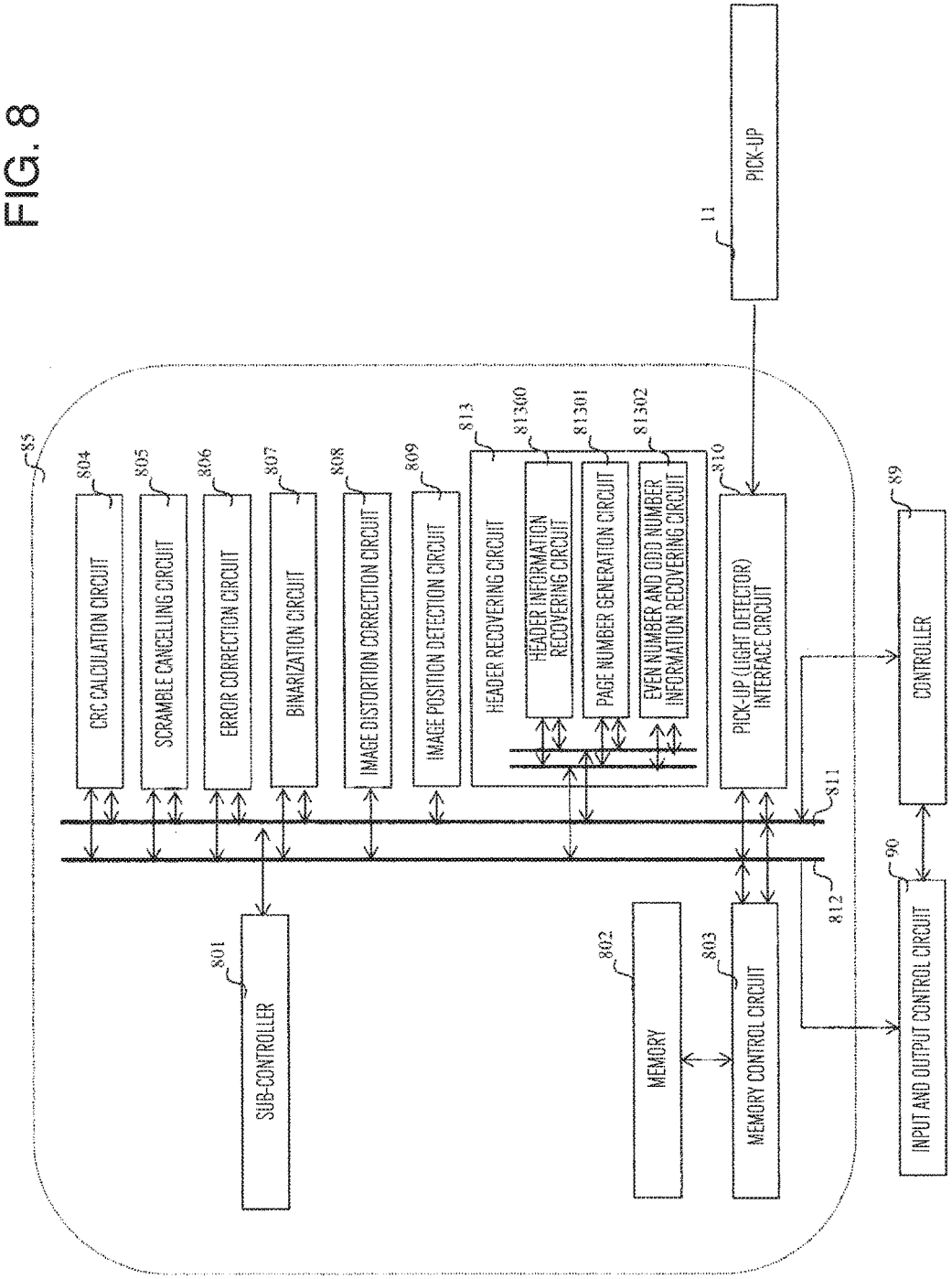
FIG. 8 is a schematic diagram illustrating the signal processing circuit in the light information recording and recovering device.

FIG. 8 is a block diagram illustrating the signal processing circuit 85 of the light information recording and recovering device 10.

When the light detector 325 in the pick-up 11 detects image data, the controller 89 commands the signal processing circuit 85 to perform recovering processing of data for a single page that is input from the pick-up 11. The processing command from the controller 89 passes through a control line 811, and the processing command is notified to a sub-controller 801 in the signal processing circuit 85. Upon receiving the notification, a sub-controller 801 controls each signal processing circuit via the control line 811 to operate to each signal processing circuit in parallel. First, the memory control circuit 803 is commanded to store, into the memory 802, image data received by way of the pick-up interface circuit 810 from the pick-up 11 via data line 812.

When the memory 802 stores a certain amount of data, a header recovering circuit 813 including a header information recovering circuit 81300, a page number generation circuit 81301, and an even number and odd number information recovering circuit 81302 performs control so that the even number and odd number information recovering circuit 81302 recovers even number and odd number information of the page number, and the page number generation circuit 81301 generates a page number from the physical symbol, and the header information recovering circuit 81300 recovers page header information such as a type, a format, a book address, and the like of the data recorded in the page data, and after identification information about the page header information detected as a result is determined to be page data which is the target of the recovering, an image position detection circuit 809 detects a marker from the image data stored in the memory 802 and extracts an effective data range. Subsequently, using the detected marker, the image distortion correction circuit 808 performs control to perform distortion correction such as inclination, magnification, distortion of the image, and converts the image data into a size of two-dimensional data expected. A binarization circuit 807 performs control to perform binarization for making determination between "0", "1" on each piece of bit data of multiple bits constituting the two-dimensional data of which size has been converted, and store the data arranged in the order of output of the recovering data on the memory 802. Subsequently, the error correction circuit 806 corrects an error included in each data string, and the scramble cancelling circuit 805 cancels scramble for adding the pseudorandom data string, and thereafter, the CRC calculation circuit 804 determines whether an error is not included in the user data on the memory 802. Thereafter, the user data is transferred from the memory 802 to the input and output control circuit 90. The detailed operation of the header recovering circuit 813 will be explained later.

Hereinafter, page header addition (616) operation for solving the above problem will be explained in details with reference to FIG. 1.

Figure 1:
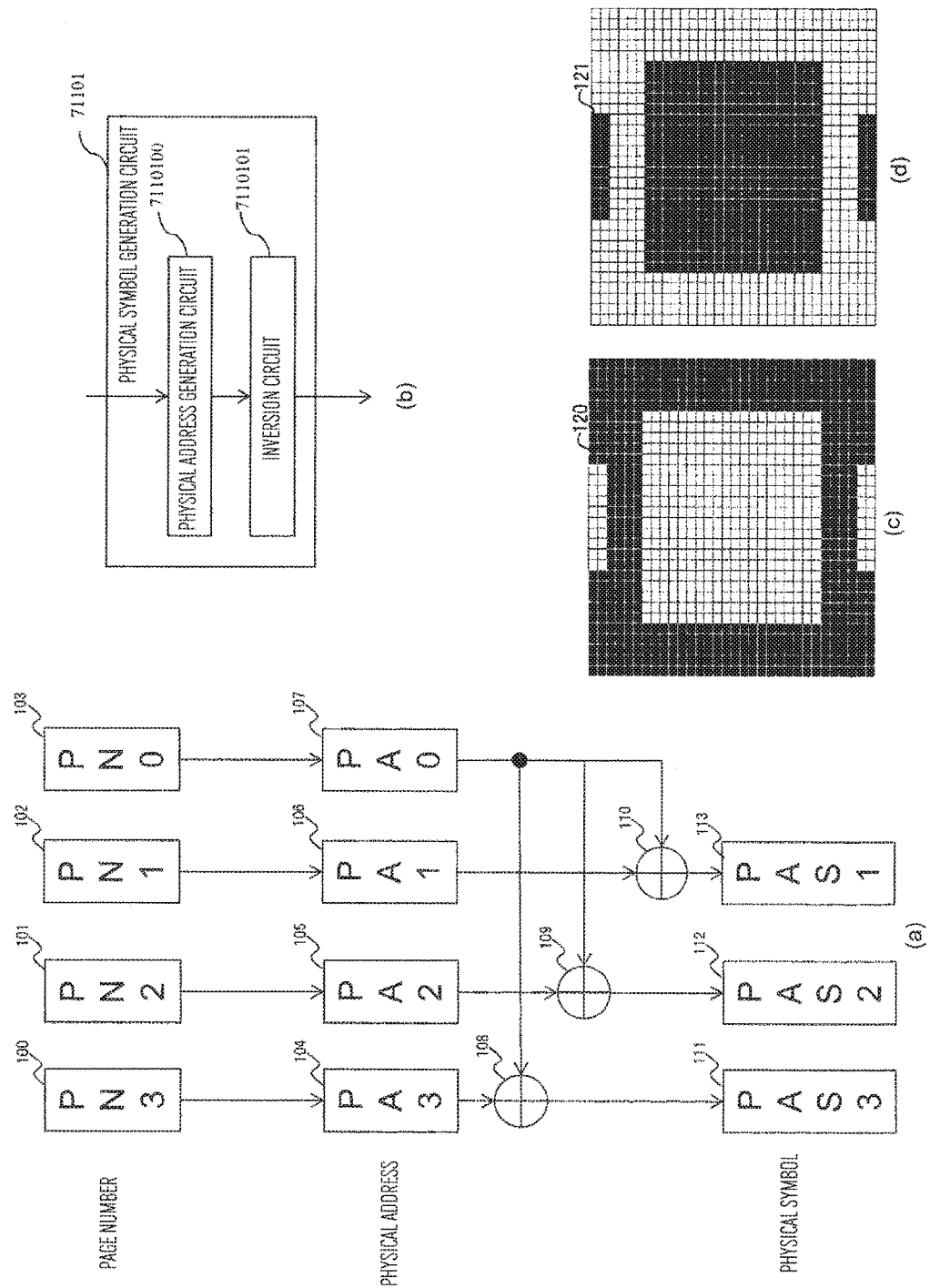
FIG. 1 is a schematic diagram illustrating a page number generation circuit.

FIG. 1(*a*) illustrates an address correlation diagram in the physical symbol generation circuit 71101. Reference symbols 100 to 103 denote page numbers corresponding to each page, reference symbols 104 to 107 denote physical addresses recorded in the page header, reference symbols 108 to 110 denote calculation devices of exclusive OR, and reference symbols 111 to 113 denote physical symbols obtained by performing bit flipping on the physical addresses in accordance with the even number and odd number property of the page number in order to suppress burn-in of the spatial light modulator 312. Number indicated in the reference symbols 100 to 113 denote bit positions, respectively. In FIG. 1(*a*), only lower four bits of the page number is shown, and the same operation as bit 1 to bit 3 are applied to the higher bits. In this case, the page number is an address corresponding to each page, and for example, the physical address is a value obtained by modulating the page number in accordance with the recording or recovering property, but the physical address may use the page number as it is without modulating the page number. The physical symbol is a value obtained by converting the physical address so that the spatial light modulator 312 is not burnt in. A pattern corresponding to a physical address is displayed in a predetermined area of the spatial light modulator 312.

FIG. 1(b) illustrates the physical symbol generation circuit 71101. The physical symbol generation circuit 71101 includes a physical address generation circuit 7110100 and an inversion circuit 7110101.

FIG. 1(c) and FIG. 1(d) illustrate markers used for the image position detection (912).

A single or multiple markers are disposed in a predetermined area on recording data in order to maintain compatibility of the device. When a fixed pattern is continuously recorded in a predetermined area, burn-in occurs in the spatial light modulator 312, and therefore, like the page header, the marker is also bit flipped on the odd-numbered page or even-numbered page and recorded. For example, on the even-numbered page, the marker of FIG. 1 (c) is recorded, and on the odd-numbered page, the marker of FIG. 1(d) is recorded. A marker used for position detection may be disposed in the header area, may be disposed outside of the header area, or may be disposed in both thereof, and the area where the marker is disposed is not limited. The marker is not limited to the shapes as shown in FIGS. 1(c) and 1(d), and may be in a shape defined in advance.

The physical address generation circuit 7110100 provides the inversion circuit 7110101 with the page numbers of 100 to 103 in the page header information received from the controller as the physical addresses of 104 to 107.

The inversion circuit 7110101 inverts the provided physical addresses of 104 to 107 except the least significant bit 107 in accordance with the even number and odd number property of the page number, and generates physical symbols 111 to 113 which are in the formats recorded to the light information medium. The inversion of the physical addresses in the inversion circuit 7110101 includes, for example, a method for calculating an exclusive OR of each bit of the physical addresses of 104 to 106 and the least significant bit 107 of the physical address as shown in FIG. 1(a), but the inversion method of the physical address is not limited thereto.

More specifically, the least significant bit 103 of the page number is not recorded in order to suppress burn-in of the spatial light modulator 312.

Figure 15A:
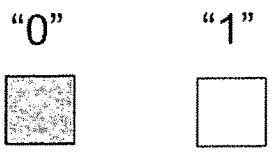
FIGS. 15A and 15B illustrate an example of a pattern corresponding to a physical symbol.
Figure 15B:
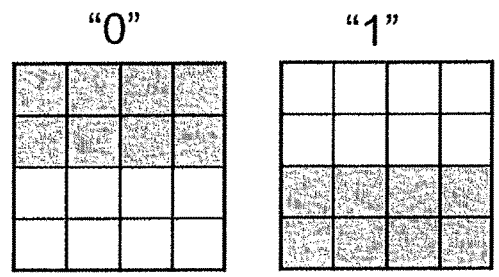

Explanation will be made in a more specific manner by using a case of FIG. 1(a) as an example. In a case where the page numbers {PN3, PN2, PN1, PN0} are {0, 0, 0, 0}, {0, 0, 0, 1}, {0, 0, 1, 0}, {0, 0, 1, 1} . . . {1, 1, 1, 0}, {1, 1, 1, 1}, the physical symbols {PAS3, PAS2, PAS1} are {0, 0, 0}, {1, 1, 1}, {0, 0, 1} . . . {1, 1, 1}, {0, 0, 0}, respectively. In FIG. 1(a), the same value as the page number is given to the physical address. In this case, each of patterns of the spatial light modulator 312 respectively corresponding to "0", "1" includes, for example, a pattern as shown in FIG. 15(a) represented by a single pixel and a pattern as shown in FIG. 15(b) in which multiple pixels are gathered. By using such pattern, the patterns corresponding to the physical symbols are displayed in a predetermined area where the page number of the spatial light modulator 312 is recorded, and the header information including the page number is made in the light information recording medium. By employing such configuration, the burn-in of the spatial light modulator 312 can be suppressed. The patterns of the spatial light modulator 312 corresponding to "0", "1" are preferably in an inversion relationship as shown in FIGS. 15(a) and 15(b).

It should be noted that the patterns of the spatial light modulator 312 corresponding to "0", "1" in the present invention is not limited to FIGS. 15(a) and 15(b), and may use other patterns.

Information of the page number least significant bit 103 not recorded corresponds to even numbers and odd-numbers of page numbers. As described above, the bit flipping of the marker used for the position detection also correspond to even-numbers and odd-numbers of page numbers. Therefore, information about the least significant bit of a page number not recorded can also be obtained from the shape of the marker used for the position detection.

Figure 5A:
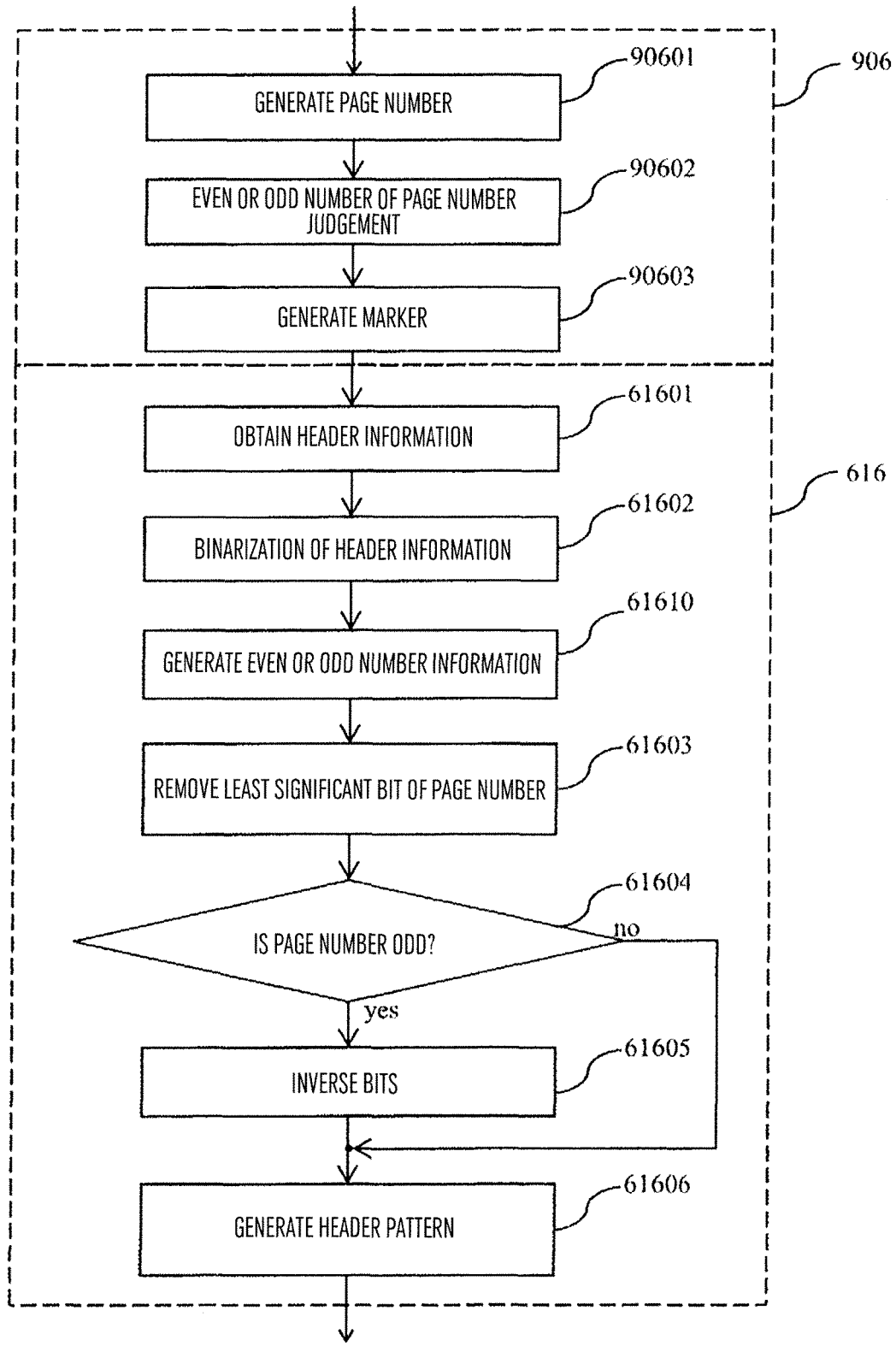
FIG. 5A is a flowchart illustrating an operation of a signal processing circuit.
Figure 5B:
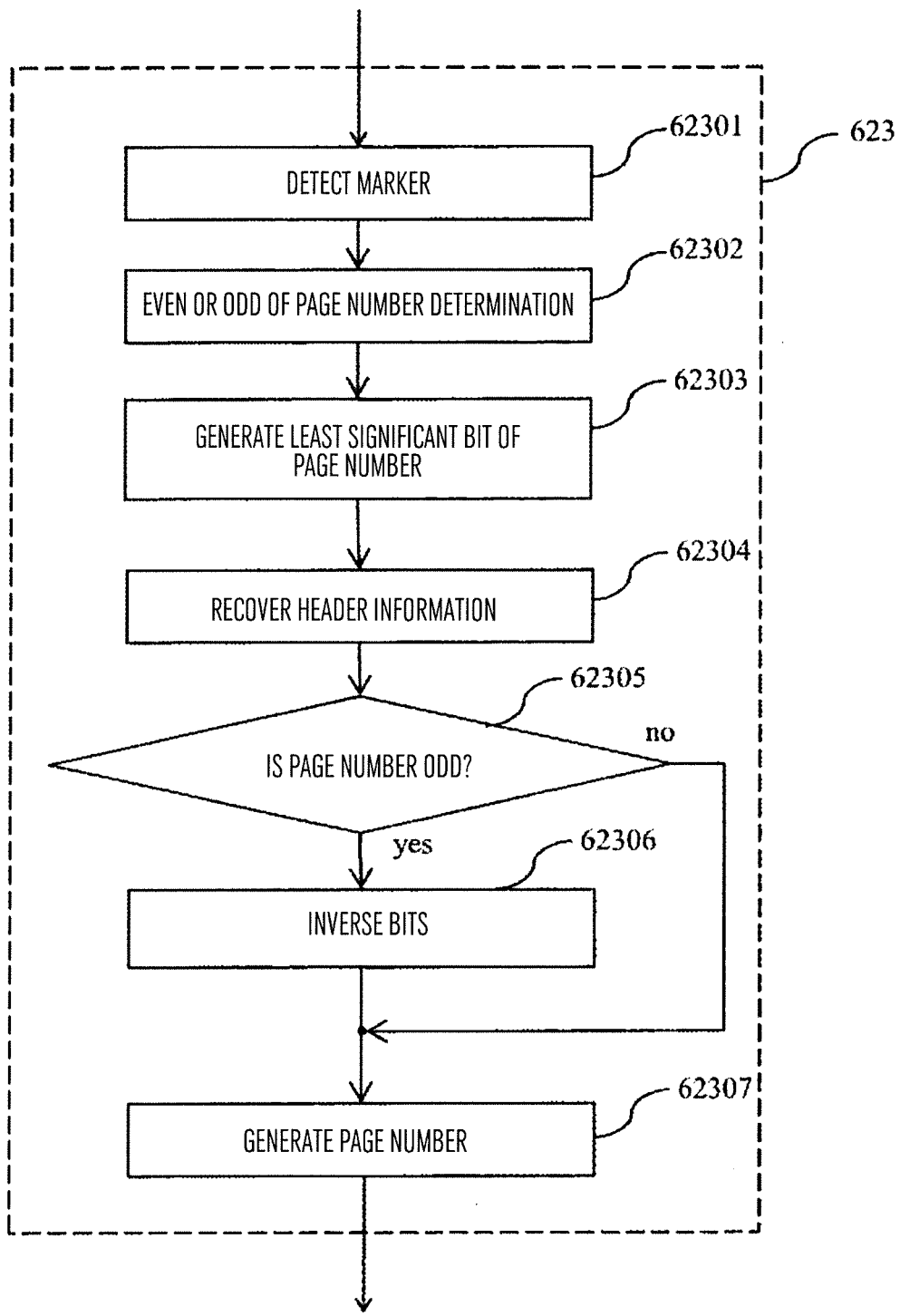
FIG. 5B is a flowchart illustrating an operation of the signal processing circuit.

The detailed processing flows of recording and recovering of the page header including the page number will be shown in FIG. 5(a) and FIG. 5(b).

Figure 9A:
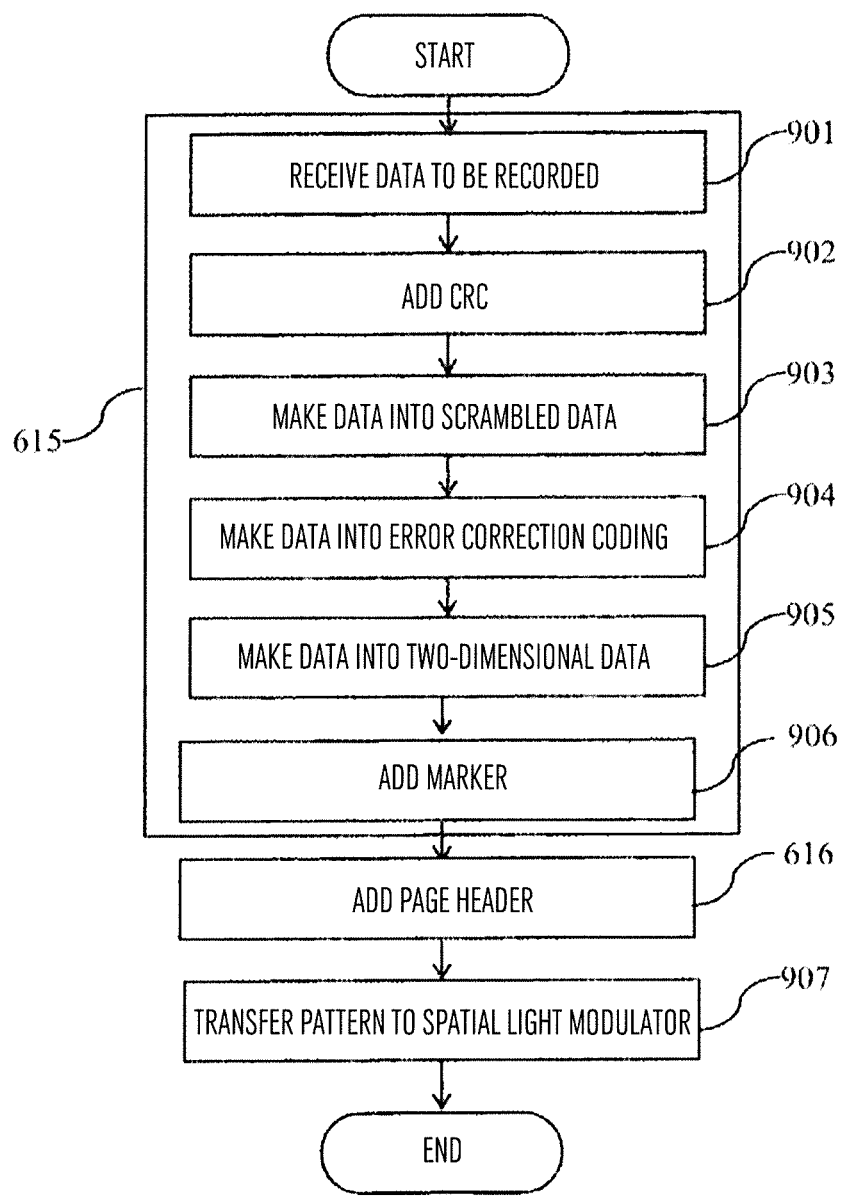
FIG. 9A is a schematic diagram illustrating an operation flow of the signal generation circuit.
Figure 9B:
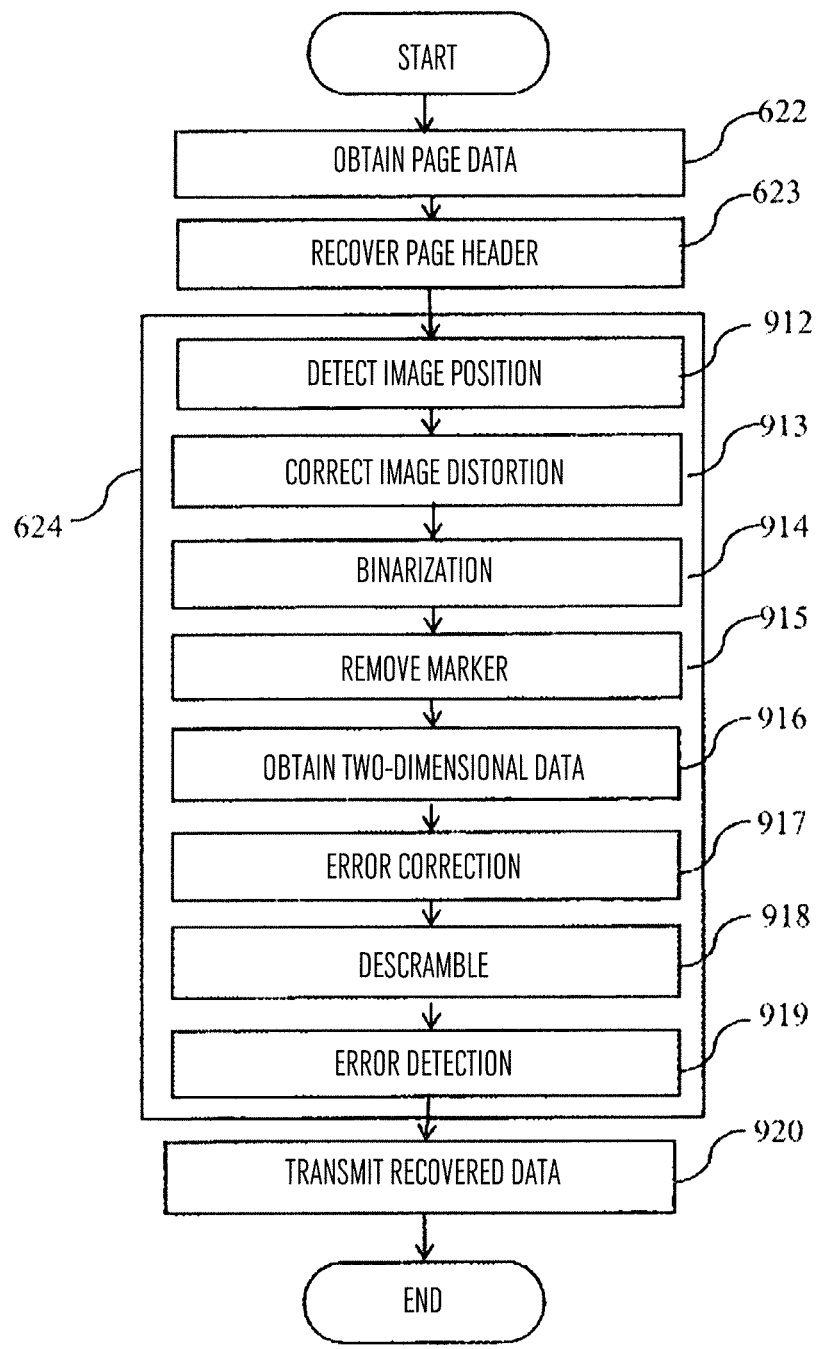
FIG. 9B is a schematic diagram illustrating an operation flow of the signal generation circuit.

The processing from 90601 to 90603 corresponds to the marker addition (906) processing of FIG. 9(a). In the recording of the page header including the page number, first, the page number is generated (90601), a determination is made as to whether the generated page number is an odd-numbered page or an even-numbered page (90602), and a marker is generated in accordance with the even number and odd number property determination of the page number. Then, the page header information is obtained (61601), and the obtained header information is binarized (61602), and in the binarized header information, the even number and odd number information of the page number is generated (61610), and the least significant bit of the page number is removed (61603). Then, an even number and odd number property determination of the page number is made from the even number and odd number information of the page number generated in 61610 (61604), and when the page number is an odd number, each bit is inverted (61605), and the generation of the header pattern upon generating the physical symbol (61606) is executed. When the page number is an even number, the bit flipping (61605) is not performed, and the generation of the header pattern (61606) is executed with the page number being the physical symbol. The header pattern generated in the processing of 61606 as well as the main data generated in the main data generation (615) is transmitted to the pick-up 11 to be recorded. In this explanation, the page header and the marker of a page to be recorded is bit flipped if it is an odd-numbered page, but bit flipping may be performed when it is an even-numbered page, and whether a page to be bit flipped is an even number or an odd number may be defined in advance. The generation (61610) of the even number and odd number information may use a result of an even number and odd number determination (90602) of a page number, or the even number and odd number information may be generated from the header information obtained in the processing of 61601.

Subsequently, the detailed operation of page header recovering including the page number will be explained. The processing from 62301 to 62304 corresponds to the page header recovering (623) of FIG. 9(b). First, the marker is detected (62301), and a determination is made as to whether the page to be recovered is an even-numbered page or an odd-numbered page (62302). Then, the least significant bit of the page number is generated from the result determined in the processing 62302 (62303), and the page header information recorded in the physical symbol format is recovered (62304). Subsequently, when a page number is determined to be an odd number from the even number and odd number determination result of the page number of 62302, the bit flipping (62306) of the page header information is performed, and then the processing in 62307 is performed, and when the page number is an even number, the processing in 62307 is performed without performing the bit flipping (62306). In 62307, the page number is generated (62307) by combining the least significant bit of the page number generated in 62303 and the information about the page number other than the least significant bit recovered from the header information, and the recovering of the header information is finished.

It should be noted that the bit flipping is not limited to the even number and odd number property of the page number, and the bit flipping may be performed with an interval at which the spatial light modulator 312 is not burned in, and in such case, information that changes with the same cycle as the cycle with which the bit flipping is performed is not recorded, and the information not recorded is obtained from the marker for the positioning. For example, in a case where the bit flipping is performed once every two pages, the bit 1 of the page number 101 also changes with the same cycle as the cycle with which the bit flipping is performed. Therefore, in the case where the bit flipping is performed once every two pages, the bit 1 is not recorded instead of the bit 0 of the page number 101, and the information about the bit 1 of the page number 101 not recorded is generated from the marker in accordance with the described method.

In the present embodiment, according to the value of the least significant bit, the inversion cycle is switched, and therefore, the circuit is made as the even number and odd number property of the page number, but in a case where the inversion cycle is different, likewise, the circuit may be made with the generation and determination circuit of the inversion cycle property information.

The information not recorded is not limited to the page number, and it may be a bit converted with the same cycle as the cycle with which the bit flipping is performed.

As described above, the least significant bit of the page number is not recorded, and information about the least significant bit of the page number is generated from the marker for positioning, so that the recording information about the page number can be recovered while the burn-in suppression of the spatial light modulator 312 is achieved.

In the bit flipping of the header patter, for example, an exclusive OR of the bit of the header pattern and the least significant bit of the page number may be performed, but the bit flipping is not limited thereto.

The same value is stored at the same book address of the header information of each page in the same book, and therefore, the physical symbol corresponding to the book address is generated by inverting each bit string of the book address with a predetermined cycle, so that, like the case of the above header patter, the burn-in of the spatial light modulator 312 can be suppressed.

As described above, a physical symbol is generated by performing different processing on information such as a page number and information such as a book address and a header pattern, so that the bur-in of the spatial light modulator 312 can be suppressed.

Second Embodiment

An overview of a recording method of a page header according to the second embodiment will be explained with reference to FIG. 10.

The second embodiment is different from the first embodiment in that at least significant bit 107 of a physical address is recorded as a physical symbol least significant bit 114 to a light information medium.

Hereinafter, only the difference from the first embodiment will be explained.

Figure 11A:
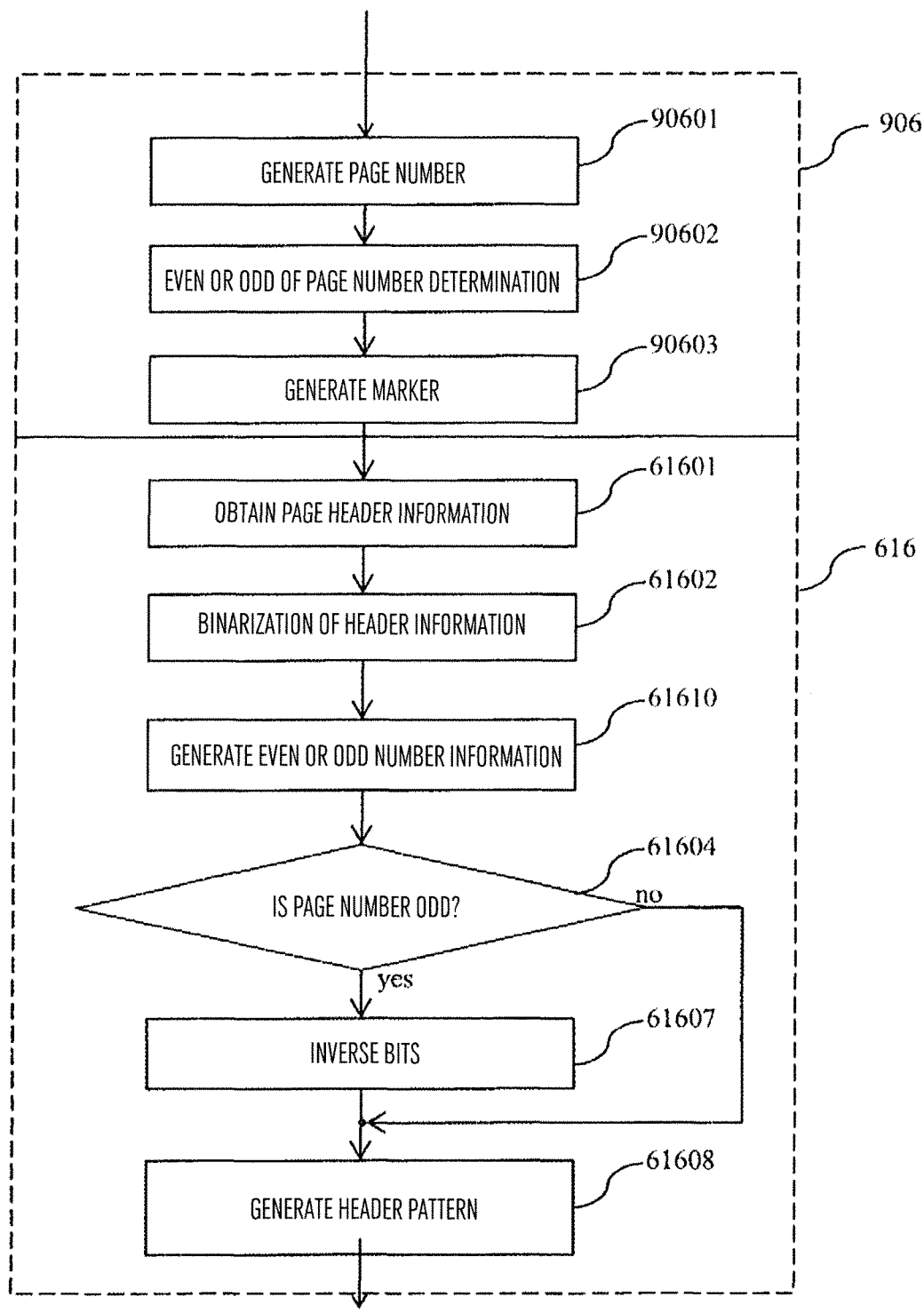
FIG. 11A is a flowchart illustrating an operation of the signal processing circuit.
Figure 11B:
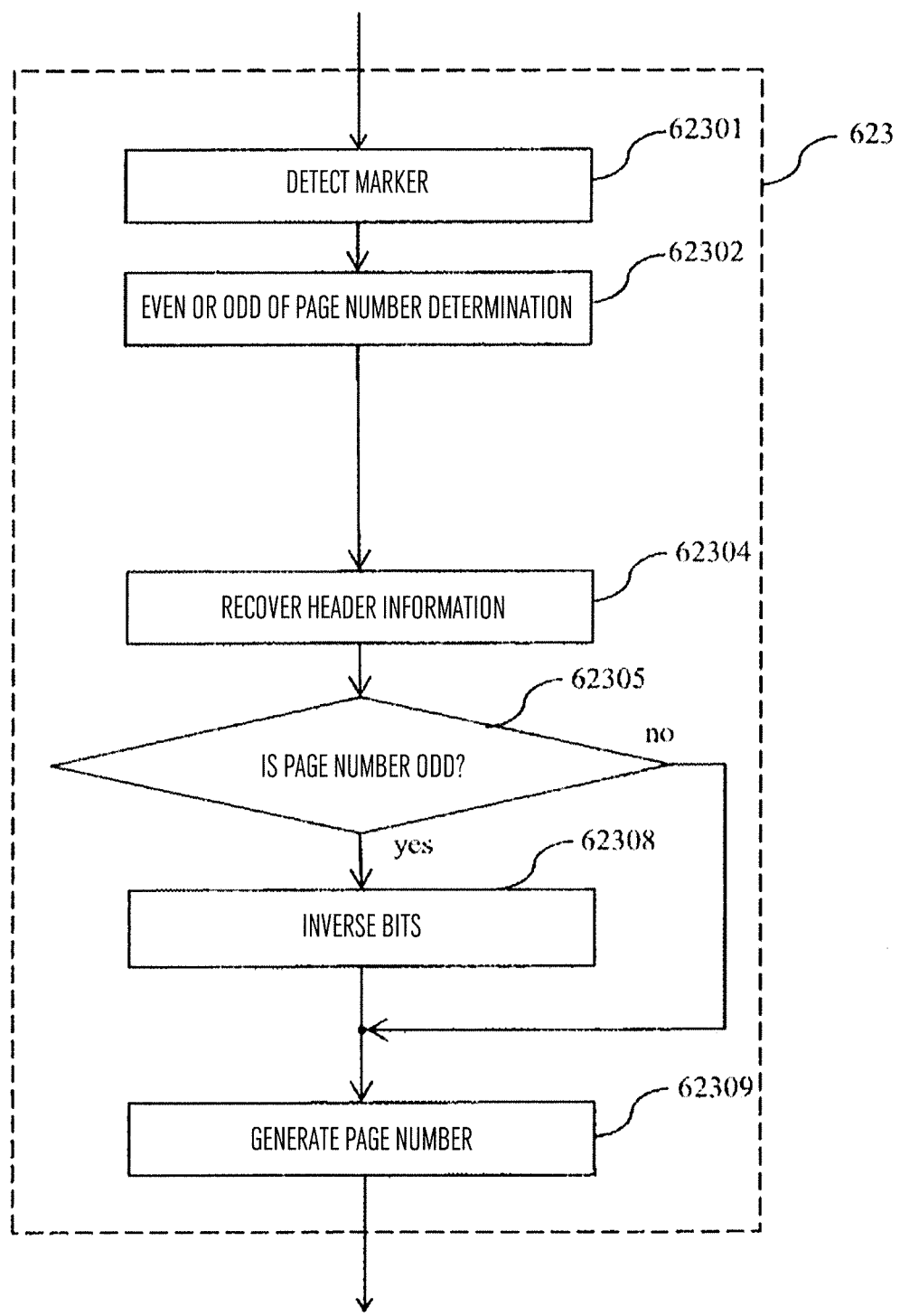
FIG. 11B is a flowchart illustrating an operation of the signal processing circuit.

A detailed processing flow of recording and recovering of a page header including a page number according to the second embodiment will be explained in FIG. 11(*a*) and FIG. 11(*b*). The second embodiment is different from the first embodiment in that the processing of removal of the least significant bit of the page number (61603) is deleted, the bit flipping (61607) and the generation method of the header pattern (61608) are different, the generation of the least significant bit of the page number (62303) is deleted, and the bit flipping (62308) and the generation of the page number (62309) are different.

In 61607, information other than the least significant bit of the page number in the header information binarized is inverted.

In 61608, in a case where the page number is an odd number, the value obtained by bit flipping those other than the least significant bit of the page number in 61607 is adopted as a physical symbol, and the header pattern is generated, and in a case where the page number is an even number, the value binarized in 61602 is adopted as a physical symbol, and the header pattern is generated.

In 62308, information other than the least significant bit of the page number is inversed.

In 62309, in a case where the page number is an odd number, the value obtained by performing the bit flipping in 62308 is adopted as a page number, and in a case where the page number is an even number, the page number recovered in 62304 is generated as the page number as it is.

In the second embodiment, an even number and odd number property of the page number may be determined from the marker for positioning, or may be determined from the least significant bit of the page number.

Figure 10B:
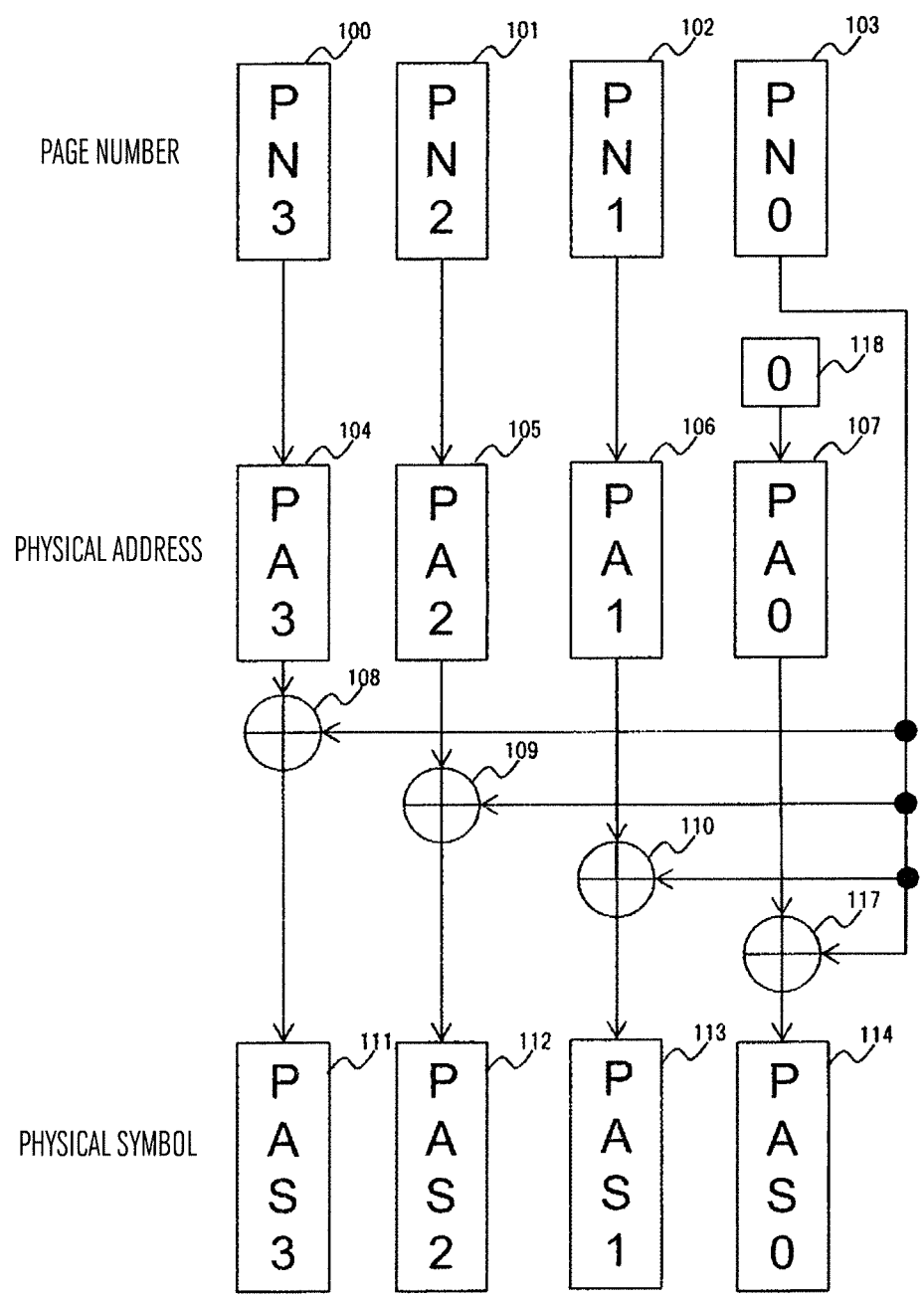
FIG. 10B is an example of a conversion method of a page number.

The physical symbols of 111 to 114 may be generated by, as illustrated in FIG. 10(*b*), fixing the least significant bit 107 of the physical address, and inverting the physical addresses in 104 to 107 in accordance with the even number and odd number property of the page number.

As described above, the least significant bit of the page number is recorded without being bit flipped for suppression of burn-in of the spatial light modulator 312, so that information such as the page number and the like can be recovered while the burn-in suppression of the spatial light modulator 312 is realized. According to this method, the even number and odd number property of the page number is not determined from the marker for positioning, and can be determined even from the least significant bit of the page number.

Like the first embodiment, the physical symbol is generated by performing different processing on information such as a page number and information such as a book address and a header pattern, so that the burn-in of the spatial light modulator 312 can be suppressed.

Third Embodiment

An overview of a recording method of a page header according to the third embodiment will be explained with reference to FIG. 12.

The third embodiment is different from the first embodiment in that the page numbers of 100 to 103 are converted to gray codes and then the physical addresses of 104 to 107 are generated, and that the physical address is inverted in accordance with the even number and odd number property of the page number and the physical symbols of 111 to 114 are generated, so that the information is recorded on the light information medium without removing the least significant bit. The gray code is an encoding method having such property that the hamming distance between the adjacent codes before and after the gray code is always one.

Only the difference from the first embodiment will be hereinafter explained.

Figure 13A:
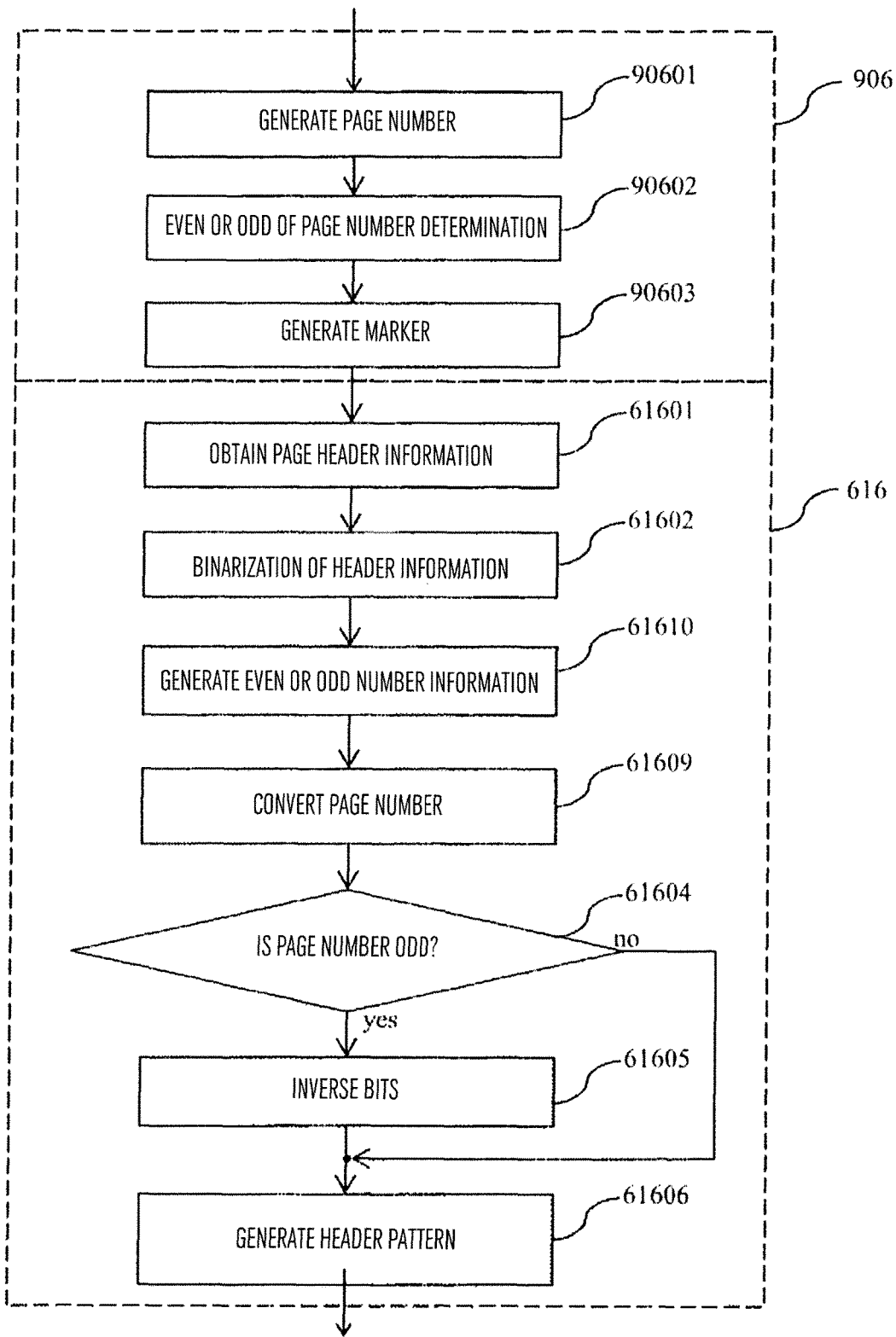
FIG. 13A is a flowchart illustrating an operation of the signal processing circuit.
Figure 13B:
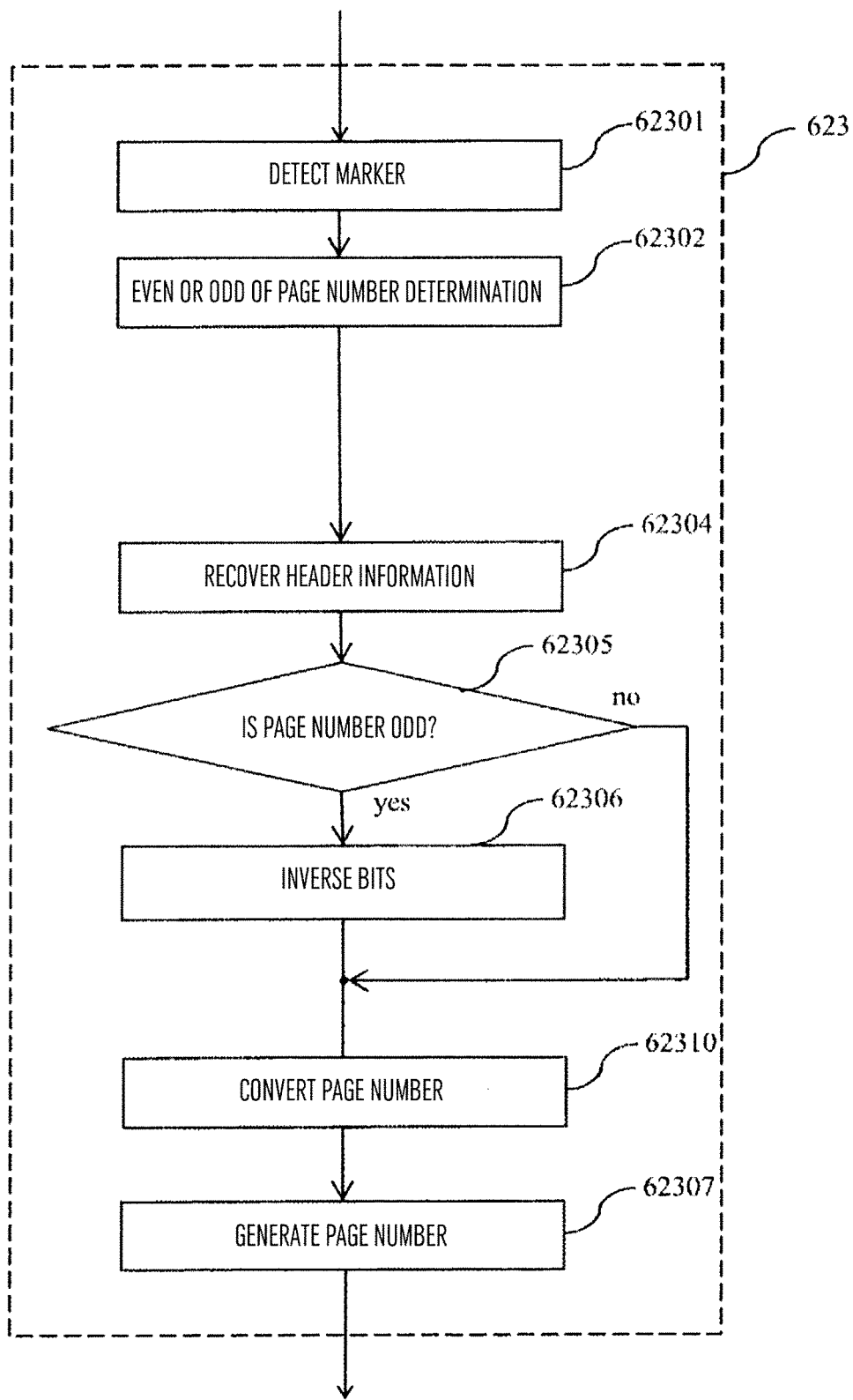
FIG. 13B is a flowchart illustrating an operation of the signal processing circuit.

The detailed processing flow of recording and recovering of a page header including a page number according to the third embodiment will be illustrated in FIG. 13(a) and FIG. 13(b). The difference from the first embodiment is that the processing of the removal 61603 of the page number least significant bit is deleted, and the processing of the conversion 61609 of the page number is added, and that the generation 62303 of the least significant bit of the page number is deleted, and the conversion 62310 of the page number is added.

In 61609, the page number in the obtained header information is converted into a gray code, and a physical address is generated.

In 62310, a conversion opposite to the gray code is performed on the recovered page header information.

Although it is the page number conversion 61609 that coverts the page number into a gray code, but the conversion method of the page number is not limited thereto. Any page number conversion method may be employed as long as the value obtained after the bit flipping is performed in accordance with the even number and odd number property of the page number is not a fixed value.

As described above, after the bit flipping is performed in accordance with the even number and odd number property of the page number in order to suppress burn-in of the spatial light modulator 312, the page number is converted in accordance with the conversion method defined in advance so that a fixed value does not continue in bits of the page number, so that the information about the page number can be recovered while the burn-in suppression of the spatial light modulator 312 is realized.

Like the above embodiment, a physical symbol is generated by performing different processing on information such as a page number and information such as a book address and a header pattern, so that the bur-in of the spatial light modulator 312 can be suppressed.

REFERENCE SIGNS LIST

1 . . . light information recording medium,
10 . . . light information recording and recovering device,
11 . . . pick-up,
12 . . . recovering reference beam optical system.
13 . . . disk cure optical system,
14 . . . disk rotation angle detection optical system,
81 . . . access control circuit,
82 . . . light source driving circuit,
83 . . . servo signal generation circuit,
84 . . . servo control circuit,
85 . . . signal processing circuit,
86 . . . signal generation circuit,
87 . . . shutter control circuit,
88 . . . disk rotation motor control circuit,
89 . . . controller,
90 . . . input and output control circuit,
91 . . . external control device,
301 . . . light source,
303 . . . shutter,
306 . . . signal beam,
307 . . . reference beam,
308 . . . beam expander.
309 . . . phase mask,
310 . . . relay lens,
311 . . . PBS prism.
312 . . . spatial light modulator.
313 . . . relay lens,
314 . . . spatial filter,
315 . . . objective lens.
316 . . . polarization direction conversion device,
320 . . . actuator,
321 . . . lens,
322 . . . lens,
323 . . . actuator,
324 . . . mirror,
325 . . . light detector
501 . . . light source,
502 . . . collimator lens.
503 . . . shutter.
504 . . . optical element,
505 . . . PBS prism.
506 . . . signal beam,
507 . . . PBS prism,
508 . . . spatial light modulator,
509 . . . angle filter,
510 . . . objective lens,
511 . . . objective lens actuator,
512 . . . reference beam,
513 . . . mirror,
514 . . . mirror,
515 . . . lens,
516 . . . galvanometer mirror,
517 . . . actuator,
518 . . . light detector.
519 . . . polarization direction conversion device,
520 . . . driving direction,
521 . . . optical block,
701 . . . sub-controller,
702 . . . memory.
703 . . . memory control circuit,
704 . . . CRC calculation circuit,
705 . . . scramble circuit,
706 . . . error correction encoding circuit,
707 . . . pick-up (spatial modulator) interface circuit,
708 . . . control line,
709 . . . data line,
710 . . . marker addition circuit,
711 . . . header addition circuit

The invention claimed is:

1. A light information device for recording two-dimensional page data to an information recording medium, comprising:

a first information generation unit for generating a first bit string;

a second information generation unit for generating a second bit string on the basis of the first bit string; and a spatial optical modulation unit configured to display a pattern corresponding to the second bit string, wherein the second information generation unit performs first processing for inverting each bit of the first bit string corresponding to first identification information with a predetermined cycle, and generates the second bit string corresponding to the first identification information, wherein:

the second information generation unit performs second processing, which is different from the first processing, on the first bit string corresponding to second identification information including a bit that switches with the same cycle as the cycle, and generates the second bit string corresponding to the second identification information, a first cycle for switching the first bit string corresponding to the first identification information being longer than the predetermined cycle, a second cycle for switching the first bit string corresponding to the second identification information being substantially similar to the predetermined cycle.

2. The light information device according to claim 1, wherein the second information generation unit generates the second bit string corresponding to the second identification information by excluding a bit that switches with the same cycle as the cycle.

3. The light information device according to claim 1, wherein in such a state in which a value of a bit that switches with the same cycle as the cycle is fixed, the second information generation unit inverts each bit in the first bit string corresponding to the second identification information with the cycle, and generates the second bit string corresponding to the second identification information.

4. The light information device according to claim 1, wherein the second information generation unit converts the first bit string corresponding to the second identification information including a bit that switches with the same cycle as the cycle into a corresponding value defined in advance so that there is not any bit converted with the cycle, and generates the second bit string corresponding to the second identification information on the basis of the bit string converted.

5. The light information device according to claim 1, wherein the cycle is a value based on an even number and odd number property.

6. The light information device according to claim 1, wherein the first identification information is information about a book number of a book constituted by a plurality of pieces of two-dimensional page data and/or a marker for position detection of two-dimensional page data, and the second identification information is a page number.

7. The light information device according to claim 1, wherein the second information generation unit calculates an exclusive OR of a bit that switches with the same cycle as the cycle in the first bit string corresponding to the second identification information and a bit other than the bit and generates the second bit string corresponding to the second identification information.

8. The light information device according to claim 4, wherein the second information generation unit converts the first bit string corresponding to the second identification information including a bit that switches with the same cycle as the cycle into a gray code, and generates the second bit string corresponding to the second identification information on the basis of the gray code converted.

9. The light information device according to claim 1, wherein in a case where the two-dimensional page data is recovered, a pattern corresponding to the second bit string is obtained, and the first bit string corresponding to the first identification information is recovered on the basis of the pattern obtained.

10. A light information processing method for recording two-dimensional page data to an information recording medium, comprising:
a first information generation step for generating a first bit string;
a second information generation step for generating a second bit string on the basis of the first bit string; and
a spatial light modulation step for displaying a pattern corresponding to the second bit string,
wherein in the second information generation step, first processing is performed to invert each bit of the first bit string corresponding to first identification information with a predetermined cycle, and the second bit string corresponding to the first identification information is generated, and second processing, which is different from the first processing, is performed on the first bit string corresponding to second identification information including a bit that switches with the same cycle as the cycle, and the second bit string corresponding to the second identification information is generated, a first cycle for switching the first bit string corresponding to the first identification information being longer than the predetermined cycle, a second cycle for switching the first bit string corresponding to the second identification information being substantially similar to the predetermined cycle.

11. The light information processing method according to claim 10, wherein in the second information generation step, the second bit string corresponding to the second identification information is generated by excluding a bit that switches with the same cycle as the cycle.

12. The light information processing method according to claim 10, wherein in the second information generation step, in such a state in which a value of a bit that switches with the same cycle as the cycle is fixed, each bit in the first bit string corresponding to the second identification information is inverted with the cycle, and the second bit string corresponding to the second identification information is generated.

13. The light information processing method according to claim 10, wherein in the second information generation step, the first bit string corresponding to the second identification information including a bit that switches with the same cycle as the cycle is converted into a corresponding value defined in advance so that there is not any bit converted with the cycle, and the second bit string corresponding to the second identification information is generated on the basis of the bit string converted.

14. The light information processing method according to claim 10, wherein the cycle is a value based on an even number and odd number property.

15. The light information processing method according to claim 10, wherein the first identification information is information about a book number of a book constituted by a plurality of pieces of two-dimensional page data and/or a marker for position detection of two-dimensional page data, and the second identification information is a page number.

16. The light information processing method according to claim 10, wherein in the second information generation step, an exclusive OR of a bit that switches with the same cycle as the cycle in the first bit string corresponding to the second identification information and a bit other than the bit is calculated, and the second bit string corresponding to the second identification information is generated.

17. The light information processing method according to claim 13, wherein in the second information generation step, the first bit string corresponding to the second identification information including a bit that switches with the same cycle as the cycle is converted into a gray code, and the second bit string corresponding to the second identification information is generated on the basis of the gray code converted.

18. The light information processing method according to claim 10, wherein in a case where the two-dimensional page data is recovered, a pattern corresponding to the second bit string is obtained, and the first bit string corresponding to the first identification information is recovered on the basis of the pattern obtained.

19. A light information device for recovering two-dimensional page data from an information recording medium, comprising a header information recovering unit for recovering header information recorded in the two-dimensional page data,
    wherein the header information recovering unit includes:
        a page number generation unit for generating a page number from page number information recorded in the header information; and
        an inversion cycle information recovering unit for recovering inversion cycle information recorded in the header information,
    wherein address information of the two-dimensional page data is generated from a recovering result of the page number generation unit and the inversion cycle information recovering unit.

20. A light information processing method for recovering two-dimensional page data from an information recording medium, comprising:
    a header information recovering step for recovering header information recorded in the two-dimensional page data;
    a page number generation step for generating a page number from page number information recorded in the header information;
    an inversion cycle information recovering step for recovering inversion cycle information recorded in the header information; and
    an address information generation step for generating address information of the two-dimensional page data from a recovering result of the inversion cycle information and the generated page number.

21. A light information processing method for recording two-dimensional page data to an information recording medium, comprising:
    a first information generation step for generating a first bit string;
    a second information generation step for generating a second bit string on the basis of the first bit string; and
    a spatial light modulation step for displaying a pattern corresponding to the second bit string,
    wherein in the second information generation step, first processing is performed to invert each bit of the first bit string corresponding to first identification information with a predetermined cycle, and the second bit string corresponding to the first identification information is generated, and
    the first processing is performed for bit strings switching with another cycle than the predetermined cycle in the first bit strings corresponding to second identification information including a bit that switches with the same cycle as the predetermined cycle, thus the second bit string corresponding to the second identification information is generated.

* * * * *